US007330767B2

(12) United States Patent
Thiele et al.

(10) Patent No.: US 7,330,767 B2
(45) Date of Patent: *Feb. 12, 2008

(54) CONFIGURATION AND VIEWING DISPLAY FOR AN INTEGRATED MODEL PREDICTIVE CONTROL AND OPTIMIZER FUNCTION BLOCK

(75) Inventors: Dirk Thiele, Austin, TX (US); Terry Blevins, Round Rock, TX (US); Ron Ottenbacher, Austin, TX (US); Wilhelm Wojsznis, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 718 days.

This patent is subject to a terminal disclaimer.

(21) Appl. No.: 10/310,416

(22) Filed: Dec. 5, 2002

(65) Prior Publication Data
US 2004/0049300 A1    Mar. 11, 2004

Related U.S. Application Data

(63) Continuation of application No. 10/241,350, filed on Sep. 11, 2002.

(51) Int. Cl.
*G05B 13/02*    (2006.01)
*G05B 11/01*    (2006.01)
*G06G 5/00*    (2006.01)
*G05B 15/00*    (2006.01)

(52) U.S. Cl. ............................... 700/29; 700/1; 700/11; 700/17; 703/2; 345/156

(58) Field of Classification Search ................. 700/29, 700/44, 1, 11, 17; 717/121, 113; 703/2; 345/156
See application file for complete search history.

(56) References Cited

U.S. PATENT DOCUMENTS 4,054,408 A    10/1977    Sheffield et al. .............. 431/12
(Continued)

FOREIGN PATENT DOCUMENTS

CN    1231436 A    10/1999
(Continued)

OTHER PUBLICATIONS

Search Report in GB 0321279.2, dated Feb. 17, 2004.
(Continued)

*Primary Examiner*—Anthony Knight
*Assistant Examiner*—Sunray Chang
(74) *Attorney, Agent, or Firm*—Marshall, Gerstein & Borun LLP

(57) ABSTRACT

An interface or display routine is provided for use in viewing and configuring a function block that performs integrated optimization and control within a process control system. The interface routine may enable a user to view or configure variables, values or other parameters associated with the integrated optimization and control block within the process control system. For example, the interface routine may display the current operating state of the integrated function block, may enable a user to select inputs and output of the function block for use in providing integrated optimization and control, may enable a user to select a particular or desired optimization function for use in the function block, etc. The interface routine may also display the multiple input output curves associated with the optimizer and the controller sections of the integrated function block in a manner that provides ease of view and selection of these curves as part of the algorithm used by the integrated function block.

31 Claims, 16 Drawing Sheets

U.S. PATENT DOCUMENTS

| | | | |
|---|---|---|---|
| 4,349,869 A | 9/1982 | Prett et al. ............... | 364/159 |
| 4,616,308 A | 10/1986 | Morshedi et al. .......... | 364/159 |
| 4,641,235 A | 2/1987 | Shigemasa et al. | |
| 4,912,624 A | 3/1990 | Harth et al. | |
| 5,018,215 A | 5/1991 | Nasr et al. | |
| 5,159,547 A | 10/1992 | Chand | |
| 5,159,562 A | 10/1992 | Putman et al. | |
| 5,180,896 A | 1/1993 | Gibby et al. | |
| 5,216,593 A | 6/1993 | Dietrich et al. | |
| 5,272,621 A | 12/1993 | Aoki et al. | |
| 5,301,101 A * | 4/1994 | MacArthur et al. .......... | 700/36 |
| 5,329,443 A | 7/1994 | Bonaquist et al. | |
| 5,335,164 A | 8/1994 | Gough, Jr. et al. | |
| 5,347,446 A * | 9/1994 | Iino et al. ................. | 700/29 |
| 5,351,184 A | 9/1994 | Lu et al. ................... | 364/165 |
| 5,384,698 A * | 1/1995 | Jelinek ..................... | 700/29 |
| 5,453,925 A | 9/1995 | Wojsznis et al. | |
| 5,461,559 A | 10/1995 | Heyob et al. | |
| 5,521,814 A | 5/1996 | Teran et al. | |
| 5,561,599 A | 10/1996 | Lu ............................ | 364/164 |
| 5,568,378 A | 10/1996 | Wojsznis | |
| 5,572,420 A | 11/1996 | Lu | |
| 5,574,638 A | 11/1996 | Lu | |
| 5,587,899 A | 12/1996 | Ho et al. | |
| 5,625,552 A | 4/1997 | Mathur et al. | |
| 5,659,667 A * | 8/1997 | Buescher et al. ........... | 706/23 |
| 5,680,304 A | 10/1997 | Wang et al. | |
| 5,682,309 A | 10/1997 | Bartusiak et al. | |
| 5,696,696 A | 12/1997 | Gunther et al. | |
| 5,748,467 A | 5/1998 | Qin et al. | |
| 5,758,047 A | 5/1998 | Lu et al. | |
| 5,886,895 A | 3/1999 | Kita et al. | |
| 5,920,478 A * | 7/1999 | Ekblad et al. ............... | 700/29 |
| 5,933,345 A | 8/1999 | Martin et al. ............... | 364/164 |
| 6,041,320 A | 3/2000 | Qin et al. | |
| 6,047,221 A | 4/2000 | Piche et al. ............... | 700/44 |
| 6,049,738 A | 4/2000 | Kayama et al. | |
| 6,055,483 A | 4/2000 | Lu | |
| 6,122,555 A | 9/2000 | Lu | |
| 6,249,712 B1 | 6/2001 | Boiquaye | |
| 6,278,899 B1 | 8/2001 | Piche et al. ............... | 700/44 |
| 6,319,362 B1 | 11/2001 | Huhtelin et al. | |
| 6,328,851 B1 | 12/2001 | Huhtelin et al. | |
| 6,336,050 B1 | 1/2002 | Amin et al. | |
| 6,445,963 B1 * | 9/2002 | Blevins et al. ............. | 700/44 |
| 6,487,459 B1 | 11/2002 | Martin et al. .............. | 700/44 |
| 6,542,782 B1 | 4/2003 | Lu | |
| 6,577,916 B1 | 6/2003 | Gehr et al. | |
| 6,615,090 B1 | 9/2003 | Blevins et al. | |
| 6,678,668 B2 | 1/2004 | Fisher et al. | |
| 6,681,155 B1 | 1/2004 | Fujita et al. | |
| 6,701,223 B1 | 3/2004 | Rachford, Jr. et al. | |
| 6,721,609 B1 | 4/2004 | Wojsznis et al. | |
| 6,772,019 B2 | 8/2004 | Karas | |
| 6,954,713 B2 * | 10/2005 | Eryurek ..................... | 702/140 |
| 6,980,938 B2 * | 12/2005 | Cutler ....................... | 703/2 |
| 6,993,396 B1 * | 1/2006 | Gerry ........................ | 700/36 |
| 2002/0103548 A1 | 8/2002 | Treiber et al. ............. | 700/30 |
| 2004/0049299 A1 | 3/2004 | Wojsznis et al. ........... | 700/29 |
| 2004/0117766 A1 * | 6/2004 | Mehta et al. ............... | 717/121 |

FOREIGN PATENT DOCUMENTS

| | | |
|---|---|---|
| EP | 0 588 594 A3 | 3/1994 |
| GB | 2 355 545 A | 4/2001 |
| JP | 11-259450 | 9/1999 |
| JP | 2001-273278 | 10/2001 |
| WO | WO-95/28666 | 10/1995 |
| WO | WO 97/12300 | 4/1997 |
| WO | WO 00/33209 | 6/2000 |

OTHER PUBLICATIONS

Thiele et al., "Configuration and Viewing Display for an Integrated Model Predictive Control and Optimizer Function Block," U.S. Appl. No. 10/310,416, filed Dec. 5, 2002.

Qin, S.J. and Badgwell, T.A., "An Overview of Industrial Model Predictive Control Technology," Fifth International Conference on Chemical Process Control, pp. 232-256, AIChE and CACHE, 1997.

Jan M. Maciejowski, "Model Predictive Control with Constraints," Pearson Education Limited, Appendix A, Appendix B, 2002.

C. Rao, S. Wright, and J. Rawlings, "Application of Interior-Point Methods to Model Predictive Control," J. Optim. Theory Appl., 99:723-757, 1998.

Willy Wojsznis, Terrence Blevins and Mark Nixon, "Easy Robust Optimal Predictive Controller," Advances in Instrumentation and Control, ISA/2000 Conference, Aug. 2000, New Orleans.

W. Wojsznis, J. Gudaz, A. Mehta, and T. Blevins, "Practical Approach to Tuning MPC," in Proceedings of ISA 2001 Conference, Sep. 10-13, 2001, Houston, TX.

Thiele, D. and Ottenbacher, R., "Simulation of Multivariable Model Predictive Control," in Proceedings of ISA 2001 Conference, Sep. 10-13, 2001, Houston, TX.

"DeltaV Predict and DeltaV PredictPro—Powerful Practical Model Predictive Control," Product data sheet, Jun. 2003.

Dirk Thiele, "Benefits and challenges of implementing model predictive control as a function block," Advances in Instrumentation and Control, ISA/2000 Conference, Aug. 2000, New Orleans.

Garcia, C.E., and A.M. Morshedi, "Quadratic Programming Solution of Dynamic Matrix Control (QDMC)," Chemical Engineering Communications, 46:73-87, 1986.

C.R. Cutler, and B.L. Ramaker, "Dynamic Matrix Control—A Computer Control Algorithm," Proceedings of the Joint Automatic Control Conference, 1980.

Chmelyk, T.T., "An Integrated Approach to Model Predictive Control of an Industrial Lime Kiln," NORPAC Controls Ltd.

MDC Technology, "RTO Technical Presentation."

Dynamic Matrix Control Corporation, "DMC Multivariable Model Predictive Constraint Control."

Garcia, C.E., Prett, D.M., and Morari, M., "Model Predictive Control: Theory and Practice—a Survey," Automatica, vol. 25, No. 3, pp. 335-348, 1989.

Froisy, J.B., "Model predictive control: Past, present and future," ISA Transactions 33:235-243, 1994.

Lee, J.H., Morari, M., and Garcia, C.E., "State-space Interpretation of Model Predictive Control," Automatica, vol. 30, No. 4, pp. 707-717, 1994.

Rawlings, J.B., Muske, K.R., "Model Predictive Control with Linear Models," Process Systems Engineering, vol. 39, No. 2, Feb. 1993.

Wojsznis, W.K., Wojsznis, P.W., "Robust Predictive Controller in Object-Oriented Implementation," ISA, Paper No. 93-297, pp. 521-528, 1993.

Lee, J.H., Yu, Z.H., "Turning of Model Predictive Controllers for Robust Performance," Computers in Chemical Engineering, vol. 18, No. 1, pp. 15-37, 1994.

MacArthur, J.W., "RMPCT: A New Robust Approach to Multivariable Predictive Control for the Process Industries," Proceedings of the 1996 Control Systems Conference, Halifax, Canada, 1996.

Shridhar, R., Cooper, D.J., "A Novel Tuning Strategy for Multivariable Model Predictive Control," ISA Transactions, vol. 36, No. 4, pp. 273-280, 1998.

Babb, Michael, "Fast Computers Open the Way For Advanced Controls," Control Engineering, Jan. 1991.

McDonnell, M., Abu el Ata-Doss, S., "Predictive Functional Control of Multivariable Systems with more Outputs than Inputs," Proceedings 28 CDC, Orlando, Florida, 1989.

Morari, M., Ricker, N.L., and Zafiriou, E., "Model Predictive Control Toolbox," Matlab® User's Guide, Version 1, The Math Works, Inc. 1995.

De Keyser, R.M.C., Van de Velde, Ph.G.A., and Dumortier F.A.G., "A Comparative Study of Self-Adaptive Long-Range Predictive Control Methods," Automatica, vol. 24, No. 2, pp. 149-163, 1988.

Rumbaugh, J., "Let There Be Objects: A Short Guide to Reification," Journal of Object-Oriented Programming, vol. 5, No. 7, Nov./Dec. 1992.

Lynch, P.M., De Paso, J., "An Object Oriented Intelligent Control Architecture," 1992 ACC/TP4, vol. 3, 92CH3072-6, Chicago.

Examination Report under Section 18(3) issued in GB 0321279.2 application by the United Kingdom Patent Office on Jun. 30, 2005.

Forrest et al., IBM System Journal, Mar. 1992, "Implementing Interior Point linear programming methods in the optimization Subroutine Library—Technical".

Hanagud et al., "Artificial Intelligence-Based Model-Adaptive Approach to Flexible Structure Control," American Institute of Aeronautics and Astronautics, Inc., vol. 13, pp. 534-544 (1990).

Misra, Jayadex Auxiliary Variables Notes on UNITY: 15-90, UT Austin (1990).

Edgar et al., "Optimization of Chemical Processes," Chapter 7, McGraw-Hill, Inc., pp. 251-298.

Hoffman et al., "Model Predictive Control: Future Requirements and Trends," ISA, 1993, Paper #93-369, pp. 1241-1247 (1993).

McMillan, "Process Control Optimization," slides entitled "Breaking Into Model Based Control" presented at *Fisher-Rosemount Systems Advanced Control Seminar*, San Antonio (1997).

U.S. Appl. No. 60/132,780, dated May 6, 1999, "Integrating Distributed Process Control System Funcationality on a Single Computer."

Wilhelm et al., "Advanced Process Control in Record Time," Control Magazine Software and Information Systems (1999).

Notice of Rejection for corresponding Japanese Application No. 2003-319683, dated Apr. 17, 2007.

English translation of First Office Action from Chinese Patent App. No. 03164972.6 issued on Aug. 9, 2007, pp. 1-3.

\* cited by examiner

| Optimizer | | | | | |
|---|---|---|---|---|---|
| Inputs (MV) | | | | | |
| Descriptor | Current Value | Target Value | Units | Unit Value | Min/Max |
| TOP_DRAW | 96.85 | 100.00 | % | 0.10 | None |
| SIDE_DRAW | 41.50 | 41.08 | % | 0.10 | None |
| BOT_REFLUX | 20.48 | 18.38 | % | 0.10 | Min |

| Outputs (CV, AV) | | | | | | | |
|---|---|---|---|---|---|---|---|
| Descriptor | Current Value | SP | Target SP | TSP Active | Prediction | Units | Unit Value |
| TOP_END_POINT | 51.10 | 51.00 | 51.00 | Yes | 51.10 | % | 1.00 |
| SIDE_END_POINT | 50.07 | 50.00 | 50.00 | Yes | 50.10 | % | 1.00 |
| TOP_TEMP | 44.40 | | 45.30 | Not in ctrl | 44.31 | % | 1.00 |
| UPPER_TEMP | 66.58 | | 70.84 | Not in ctrl | 66.79 | % | 1.00 |
| BOT_TEMP | 4.85 | 50.00 | 5.03 | Yes | 4.89 | % | 1.00 |
| INT_TEMP | 11.84 | | 10.90 | Not in ctrl | 11.94 | % | 1.00 |
| SIDE_TEMP | 39.32 | | 40.94 | Not in ctrl | 39.70 | % | 1.00 |

Target SP de/activation -rightclick on Yes/No
Unit Value Change -rightclick on Value
Minimize/Maximize/None change -rightclick on Min/Max/None
Priority -rightclick on value

[Close]

CONFIGURATION AND VIEWING DISPLAY FOR AN INTEGRATED MODEL PREDICTIVE CONTROL AND OPTIMIZER FUNCTION BLOCK

RELATED APPLICATION

The application is a continuation application of and claims priority from U.S. patent application Ser. No. 10/241,350, entitled "Integrated Model Predictive Control and Optimization within a Process Control System," which was filed on Sep. 11, 2002.

FIELD OF THE INVENTION

The present invention relates generally to process control systems and, more particularly, to the use of an optimized model predictive controller within a process control system.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Process controllers are typically programmed to execute different algorithms, sub-routines or control loops (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and a single output block, such as an analog output (AO) function block. These control loops typically perform single-input/single-output control because the control block creates a single control output used to control a single process input, such as a valve position, etc. However, in certain cases, the use of a number of independently operating, single-input/single-output control loops is not very effective because the process variables being controlled are affected by more than a single process input and, in fact, each process input may affect the state of many process outputs. An example of this might occur in, for example, a process having a tank being filled by two input lines, and being emptied by a single output line, each line being controlled by a different valve, and in which the temperature, pressure and throughput of the tank are being controlled to be at or near desired values. As indicated above, the control of the throughput, the temperature and the pressure of the tank may be performed using a separate throughput control loop, a separate temperature control loop and a separate pressure control loop. However, in this situation, the operation of the temperature control loop in changing the setting of one of the input valves to control the temperature within the tank may cause the pressure within the tank to increase, which, for example, causes the pressure loop to open the outlet valve to decrease the pressure. This action may then cause the throughput control loop to close one of the input valves, thereby affecting the temperature and causing the temperature control loop to take some other action. As will be understood in this example, the single-input/single-output control loops cause the process outputs (in this case, throughput, temperature and pressure) to behave in an unacceptable manner wherein the outputs oscillate without ever reaching a steady state condition.

Model predictive control (MPC) or other types of advanced control have been used to perform process control in situations in which changes to a particular controlled process variable affects more than one process variable or output. Since the late 1970s, many successful implementations of model predictive control have been reported and MPC has become the primary form of advanced multivariable control in the process industry. Still further, MPC control has been implemented within distributed control systems as distributed control system layered software. U.S. Pat. Nos. 4,616,308 and 4,349,869 generally describe MPC controllers that can be used within a process control system.

Generally speaking, MPC is a multiple-input/multiple output control strategy in which the effects of changing each of a number of process inputs on each of a number of process outputs is measured and these measured responses are then used to create a control matrix or a model of the process. The process model or control matrix (which generally defines the steady state operation of the process) is inverted mathematically and is then used in or as a multiple-input/multiple-output controller to control the process outputs based on changes made to the process inputs. In some cases, the process model is represented as a process output response curve (typically a step response curve) for each of the process inputs and these curves may be created based on a series of, for example, pseudo-random step changes delivered to each of the process inputs. These response curves can be used to model the process in known manners. Model predictive control is known in the art and, as a result, the specifics thereof will not be described herein. However, MPC is described generally in Qin, S. Joe and Thomas A. Badgwell, "An Overview of Industrial Model Predictive Control Technology," *AIChE Conference,* 1996.

MPC has been found to be a very effective and useful control technique and has used in conjunction with process optimization. To optimize a process which uses MPC, an optimizer minimizes or maximizes one or more process input variables determined by the MPC routine so as to cause the process to run at an optimal point. While this technique is computationally possible, it is necessary to select the process variables that have, for example, a significant impact on improving the economic operation of the process (e.g. process throughput or quality) to optimize the process from an economic standpoint. Operating the process at an optimal point from a financial or economic viewpoint typically requires controlling many process variables in conjunction with one another, not just a single process variable.

Optimizing with the use of quadratic programming techniques or more current techniques like interior point methods has been proposed as a solution to providing dynamic optimization with MPC. With these methods, an optimization solution is determined and the optimizer provides the controller with moves in the controller outputs (i.e., the manipulated variables of the process), taking into account process dynamics, current constraints and optimization objectives. However, this approach has a tremendous computational burden and is not practically feasible at the current technology level.

In most cases when using MPC, the number of manipulated variables available within the process (i.e., the control outputs of the MPC routine) is greater than the number of control variables of the process (i.e., the number of process variables that must be controlled to be at a particular set point). As a result, there are usually more degrees of freedom that are available for optimization and constraint handling. Theoretically, to perform such optimization, values expressed by process variables, constraints, limits and economic factors defining an optimal operation point of the process should be calculated. In many cases, these process variables are constrained variables because they have limits related to physical properties of the process to which they pertain and within which these variables must be kept. For example, a process variable representing tank level is limited to the maximum and minimum levels of the actual tank physically achievable. An optimizing function may calculate the costs and/or profits associated with each of the constrained or auxiliary variables to operate at a level in which profit is maximized, costs are minimized, etc. Measurements of these auxiliary variables can then be provided as inputs to the MPC routine and treated by the MPC routine as control variables having a set point equal to the operational point for the auxiliary variable defined by the optimization routine.

MPC delivers the best performance often required by the application only for square control, in which the number of control inputs to the process (i.e., the manipulated variables developed by the control routine) is equal to the number of process variables being controlled (i.e., the inputs to the controller). In most cases however, the number of auxiliary constraint variables plus the number of process control variables is greater than the number of manipulated variables. Implementation of MPC for such non-square configurations leads to unacceptably poor performance.

It is believed that others have tried to overcome this problem by dynamically selecting a set of control and constrained variables equal to the number of manipulated variables and generating the controller on-line or during process operation to determine the next moves in the manipulated variables. This technique, however, is computationally expensive because it applies matrix inversion and can not be use in some cases, like MPC implemented as a function block in a process controller. Equally important is that some combinations of inputs and outputs of the generated controller may result in an ill-conditioned controller, which results in unacceptable operation. While conditioning of the controller can be verified and improved when the controller configuration is set up off-line, this task is an excessive burden for on-line operation and is practically impossible to implement at the controller level.

SUMMARY

An interface or display routine is provided for use in viewing and configuring a function block that performs integrated optimization and control within a process control system. The interface routine may enable a user to view or configure variables, values or other parameters associated with the integrated optimization and control block within the process control system. For example, the interface routine may display the current operating state of the integrated function block, may enable a user to select inputs and output of the function block for use in providing integrated optimization and control, may enable a user to select a particular or desired optimization function for use in the function block, etc. The interface routine may also display the multiple input output curves associated with the optimizer and the controller sections of the integrated function block in a manner that provides ease of view and selection of these curves as part of the algorithm used by the integrated function block.

In one embodiment, a process control configuration system for use in creating or viewing a control block having an integrated optimizer and a multiple-input/multiple-output control routine includes a computer readable medium and a configuration routine stored on the computer readable medium and adapted to be executed on a processor, the configuration routine including a storage routine that stores information pertaining to a plurality of control and auxiliary variables and to a multiplicity of manipulated variables used by one or both of the optimizer and the multiple-input/multiple-output control routine. The process control configuration system also includes a display routine adapted to present a display to a user regarding one or more of the control, auxiliary and manipulated variables.

If desired, the storage routine is adapted to store a plurality of response curves, each of the response curves defining the response of one of the control and auxiliary variables to one of the manipulated variables and the display routine is adapted to present on a display a subset of the response curves to be viewed by a user, the subset of the response curves including the response of each of the control and auxiliary variables to one of the manipulated variables. If desired, the configuration routine may include a routine that enables a user to select one of the control and auxiliary variables as being best responsive to one of the manipulated variables on the display and may include a routine that enables the user to cut and copy response curves for variables within the control block.

BRIEF DESCRIPTION OF THE DRAWINGS

FIG. 15 is a screen display illustrating a dialog screen which provides information to the operator during operation of the advanced control block; and FIG. 16 is a screen display illustrating a diagnostics screen that may be provided to a user or operator to perform diagnostics on an advanced control block.

DESCRIPTION OF THE PREFERRED EMBODIMENTS

Figure 1:
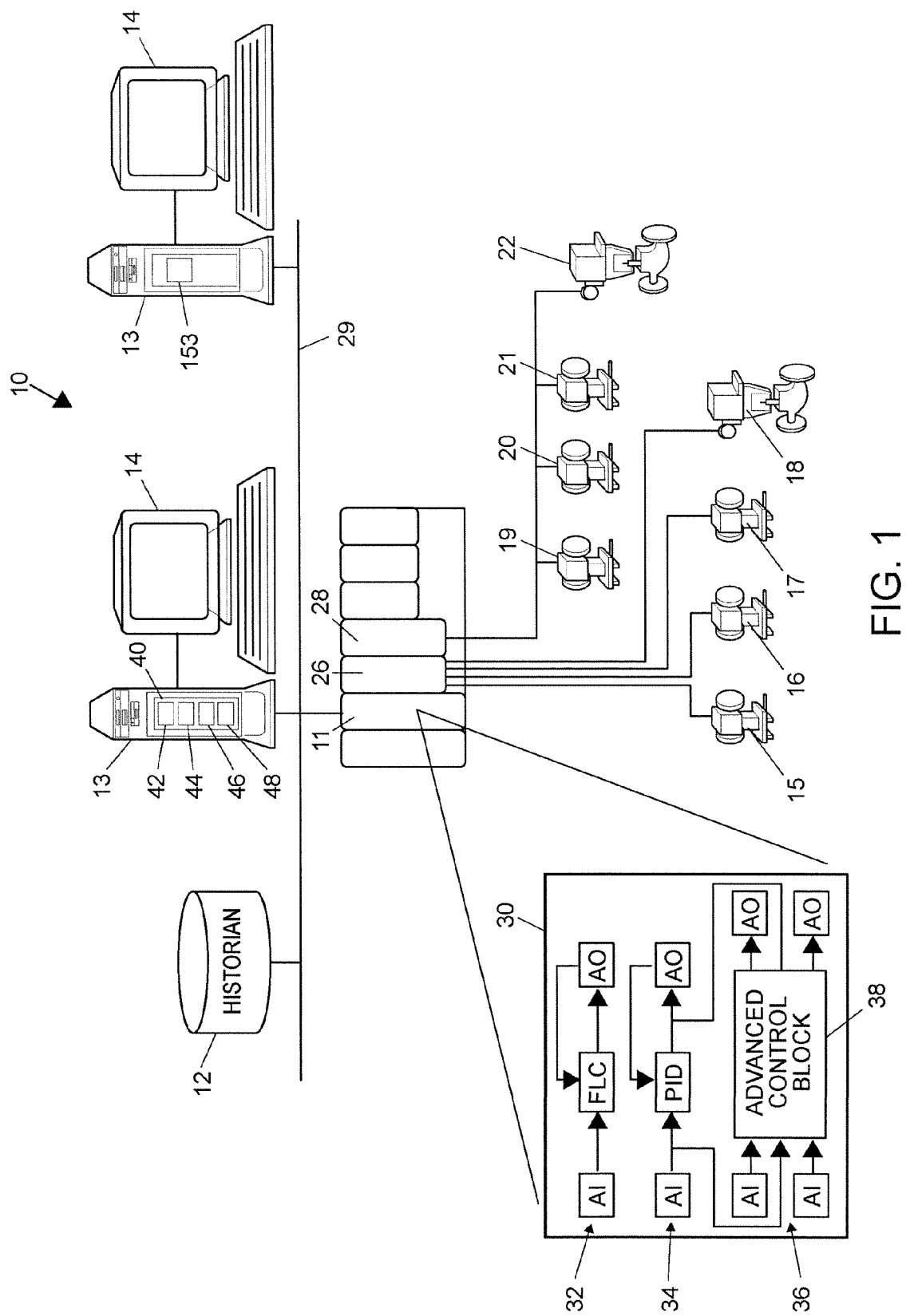
FIG. 1 is a block diagram of an process control system including a control module having an advanced controller function block that integrate an optimizer with an MPC controller.

Referring now to FIG. 1, a process control system 10 includes a process controller 11 communicatively connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data and may be separate from (as illustrated in FIG. 1) or a part of one of the workstations 13. The controller 11, which may be, by way of example, the DeltaV™ controller sold by Fisher-Rosemount Systems, Inc., is communicatively connected to the host computers 13 and the data historian 12 via, for example, an Ethernet connection or any other desired communication network 29. The communication network 29 may be in the form of a local area network (LAN), a wide area network (WAN), a telecommunications network, etc. and may be implemented using hardwired or wireless technology. The controller 11 is communicatively connected to the field devices 15-22 using any desired hardware and software associated with, for example, standard 4-20 ma devices and/or any smart communication protocol such as the FOUNDATION Fieldbus protocol (Fieldbus), the HART protocol, etc.

The field devices 15-22 may be any types of devices, such as sensors, valves, transmitters, positioners, etc. while the I/O cards 26 and 28 may be any types of I/O devices conforming to any desired communication or controller protocol. In the embodiment illustrated in FIG. 1, the field devices 15-18 are standard 4-20 ma devices that communicate over analog lines to the I/O card 26 while the field devices 19-22 are smart devices, such as Fieldbus field devices, that communicate over a digital bus to the I/O card 28 using Fieldbus protocol communications. Of course, the field devices 15-22 could conform to any other desired standard(s) or protocols, including any standards or protocols developed in the future.

The controller 11, which may be one of many distributed controllers within the plant 10 having at least one processor therein, implements or oversees one or more process control routines, which may include control loops, stored therein or otherwise associated therewith. The controller 11 also communicates with the devices 15-22, the host computers 13 and the data historian 12 to control a process in any desired manner. It should be noted that any control routines or elements described herein may have parts thereof implemented or executed by different controllers or other devices if so desired. Likewise, the control routines or elements described herein to be implemented within the process control system 10 may take any form, including software, firmware, hardware, etc. For the purpose of this discussion, a process control element can be any part or portion of a process control system including, for example, a routine, a block or a module stored on any computer readable medium. Control routines, which may be modules or any part of a control procedure such as a subroutine, parts of a subroutine (such as lines of code), etc. may be implemented in any desired software format, such as using ladder logic, sequential function charts, function block diagrams, object oriented programming or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 11 may be configured to implement a control strategy or control routine in any desired manner.

In one embodiment, the controller 11 implements a control strategy using what are commonly referred to as function blocks, wherein each function block is a part or object of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which may be the case with Fieldbus devices. While the description of the control system is provided herein using a function block control strategy which uses an object oriented programming paradigm, the control strategy or control loops or modules could also be implemented or designed using other conventions, such as ladder logic, sequential function charts, etc. or using any other desired programming language or paradigm.

As illustrated by the expanded block 30 of FIG. 1, the controller 11 may include a number of single-loop control routines, illustrated as routines 32 and 34, and may implement one or more advanced control loops, illustrated as control loop 36. Each such loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to numerous AI function blocks and outputs communicatively connected to numerous AO function blocks, although the inputs and outputs of the advanced control block 38 may be communicatively connected to any other desired function blocks or control elements to receive other types of inputs and to provide other types of control outputs. As will be described further, the advanced control block 38 may be a control block that integrates a model predictive control routine with an optimizer to perform optimized control of the process or a portion of the process. While the advanced control block 38 will be described herein as including a model predictive control (MPC) block, the advanced control block 38 could include any other multiple-input/multiple-output control routine or procedure, such as a neural network modeling or control routine, a multi-variable fuzzy logic control routine, etc. It will be understood that the function blocks illustrated in FIG. 1, including the advanced control block 38, can be executed by the controller 11 or, alternatively, can be located in and executed by any other processing device, such as one of the workstations 13 or even one of the field devices 19-22.

As illustrated in FIG. 1, one of the workstations 13 includes an advanced control block generation routine 40 that is used to create, download and implement the advanced control block 38. While the advanced control block generation routine 40 may be stored in a memory within the workstation 13 and executed by a processor therein, this routine (or any part thereof) may additionally or alternatively be stored in and executed by any other device within the process control system 10, if so desired. Generally speaking, the advanced control block generation routine 40 includes a control block creation routine 42 that creates an advanced control block as further described herein and that connects this advanced control block into the process control system, a process modeling routine 44 that creates a process model for the process or a portion thereof based on data collected by the advanced control block, a control logic parameter creation routine 46 that creates control logic parameters for the advanced control block from the process model and that stores or downloads these control logic parameters in the advanced control block for use in controlling the process and an optimizer routine 48 that creates an optimizer for use with the advanced control block. It will be understood the routines 42, 44, 46 and 48 can be made up of a series of different routines, such as a first routine that creates an advanced control element having control inputs adapted to receive process outputs and having control outputs adapted to provide control signals to process inputs, a second routine that enables a user to download and communicatively connect the advanced control element within the process control routine (which may be any desired configuration routine), a third routine that uses the advanced control element to provide excitation waveforms to each of the process inputs, a fourth routine that uses the advanced control element to collect data reflecting the response of each of the process outputs to the excitation waveforms, a fifth routine that selects or enables a user to select a set of inputs for the advanced control block, a sixth routine that creates a process model, a seventh routine that develops advanced control logic parameters from the process model, an eighth routine that places the advanced control logic and, if needed, the process model within the advanced control element to enable the advanced control element to control the process and a ninth routine that selects or enables a user to select an optimizer for use in the advanced control block 38.

Figure 2:
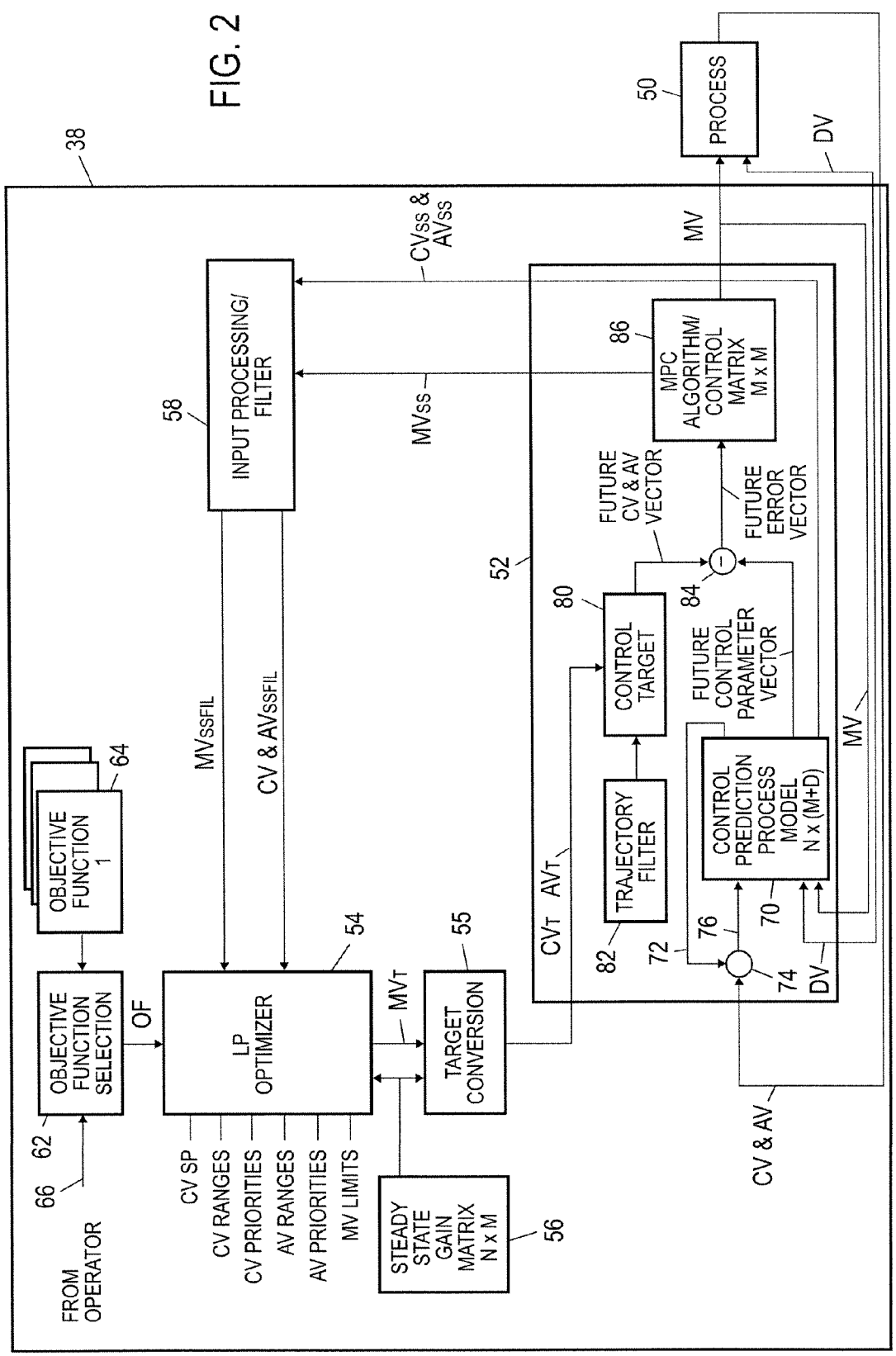
FIG. 2 is a block diagram of the advanced controller function block of FIG. 1 having an integrated optimizer and MPC controller.

FIG. 2 illustrates a more detailed block diagram of one embodiment of the advanced control block 38 communicatively coupled to a process 50, it being understood that the advanced control block 38 produces a set of manipulated variables MVs that are provided to other function blocks which, in turn, are connected to control inputs of the process 50. As illustrated in FIG. 2, the advanced control block 38 includes an MPC controller block 52, an optimizer 54, a target conversion block 55, a step response model or control matrix 56 and a input processing/filter block 58. The MPC controller 52 may be any standard, square M by M (where M can be any number greater than one) MPC routine or procedure having the same number of inputs as outputs. The MPC controller 52 receives, as inputs, a set of N control and auxiliary variables CV and AV (which are vectors of values) as measured within the process 50, a set of disturbance variables DV which are known or expected changes or disturbances provided to the process 50 at some time in the future and a set of steady state target control and auxiliary variables $CV_T$ and $AV_T$ provided from the target conversion block 55. The MPC controller 52 uses these inputs to create the set of M manipulated variables MV (in the form of control signals) and delivers the manipulated variable MV signals to control the process 50.

Still further, the MPC controller 52 calculates and provides a set of predicted steady state control variables $CV_{SS}$ and auxiliary variables $AV_{SS}$ along with a set of predicted steady state manipulated variables $MV_{SS}$ representing the predicted values of the control variables CV, the auxiliary variables AV and the manipulated variables MV, respectively, at the control horizon, to the input processing/filter block 58. The input processing/filter block 58 processes the determined predicted steady state values of the control, auxiliary and manipulated variables $CV_{SS}$, $AV_{SS}$ and $MV_{SS}$ to reduce the effects of noise and unpredicted disturbances on these variables. It will be understood that the input processing/filter block 58 may include a low pass filter or any other input processing that reduces the effects of noise, modeling errors and disturbances on these values and provides the filtered control, auxiliary and manipulated variables $CV_{SSfil}$, $AV_{SSfil}$ and $MV_{SSfil}$ to the optimizer 54.

The optimizer 54 is, in this example, a linear programming (LP) optimizer that uses an objective function (OF) that may be provided from a selection block 62 to perform process optimization. Alternatively, the optimizer 54 could be a quadratic programming optimizer which is an optimizer with a linear model and a quadratic objective function. Generally speaking, the objective function OF will specify costs or profits associated with each of a number of control, auxiliary and manipulated variables and the optimizer 54 sets target values for those variables by maximizing or minimizing the objective function. The selection block 62 may select the objective function OF provided to the optimizer 54 as one of a set of pre-stored objective functions 64 which mathematically represent different manners of defining optimal operation of the process 50. For example, one of the pre-stored objective functions 64 may be configured to maximize the profit of the plant, another one of the objective functions 64 may be configured to minimize the use of a particular raw material that is in short supply while a still further one of the objective functions 64 may be configured to maximize the quality of the product being manufactured within the process 50. Generally speaking, the objective function uses a cost or profit associated with each move of a control, auxiliary and manipulated variable to determine the most optimal process operating point within the set of acceptable points as defined by the set point values or ranges of the control variables CV and the limits of the auxiliary and manipulated variables AV and MV. Of course, any desired objective function can be used instead or in addition to those described herein including objective functions which optimize each of a number of concerns, such as use of a raw material, profitability, etc. to some degree.

To select one of the objective functions 64, a user or operator may provide an indication of the objective function 64 to be used by selecting that objective function on an operator or user terminal (such as one of the workstations 13 of FIG. 1) which selection is provided via an input 66 to the selection block 62. In response to the input 66, the selection block 62 provides the selected objective function OF to the optimizer 54. Of course, the user or operator can change the objective function being used during operation of the process. If desired, a default objective function may be used in cases in which the user does not provide or select an objective function. One possible default objective function will be discussed in more detail below. While illustrated as being part of the advanced control block 38, the different objective functions may be stored in the operator terminal 13 of FIG. 1 and one of these objective functions may be provided to the advanced control block 38 during the creation or generation of this block.

In addition to the objective function OF, the optimizer 54 receives, as inputs, a set of control variable set points (which are typically operator specified set points for the control variables CV of the process 50 and may be changed by the operator or other user) and a range and weight or priority associated with each of the control variables CV. The optimizer 54 additionally receives a set of ranges or constraint limits and a set of weights or priorities for the auxiliary variables AV and a set of limits for the manipulated variables MV being used to control the process 50. Generally speaking, the ranges for the auxiliary and manipulated variables define the limits (typically based on physical properties of the plant) for the auxiliary and manipulated variables while the ranges for the control variables provide a range in which the control variables may operate for satisfactory control of the process. The weights for the control and auxiliary variables specify the relative importance of the control variables and the auxiliary variables with respect to one another during the optimization process and may be used, in some circumstances, to enable the optimizer 54 to generate a control target solution if some of the constraints are violated.

During operation, the optimizer 54 may use a linear programming (LP) technique to perform optimization. As is known, linear programming is a mathematical technique for solving a set of linear equations and inequalities that maximizes or minimizes a certain additional function called the objective function. As discussed above, the objective function may express economic value like cost or profit but may express other objectives instead. Further, as will be understood, the steady state gain matrix defines the steady state gain for each possible pair of the manipulated variables and the control or auxiliary variables. In other words, the steady state gain matrix defines the steady state gain in each control and auxiliary variable for a unit change in each of the manipulated and disturbance variables. This steady state gain matrix is generally an N by M matrix, where N is the number of control and auxiliary variables and M is the number of manipulated variables used in the optimizer routine. Generally, N can be greater than, equal to, or less than M, with the most common case being that N is greater than M.

Using any known or standard LP algorithm or technique, the optimizer 54 iterates to determine the set of target manipulated variables $MV_T$ (as determined from the steady state gain matrix) which maximize or minimize the selected objective function OF while resulting an process operation that meets or falls within the control variable CV set point range limits, the auxiliary variable AV constraint limits and the manipulated variable MV limits. In one embodiment, the optimizer 54 actually determines the change in the manipulated variables and uses the indication of the predicted steady state control variables, auxiliary variables and manipulated variables $CV_{SSfil}$, $AV_{SSfil}$ and $MV_{SSfil}$ to determine the changes in the process operation from its current operation, that is, to determine the dynamic operation of the MPC control routine during the process of reaching the target or optimal process operating point. This dynamic operation is important as it is necessary to assure that none of the constraint limits is violated during the move from the current operating point to the target operating point.

In one embodiment, the LP optimizer 54 may be designed to minimize an objective function of the following form:

$$Q = P^{t*}A^{*}\Delta MV + C^{t}\Delta MV$$

wherein:
Q=total cost/profit
P=profit vector associated with the AVs and CVs
C=cost vector associated with MVs
A=Gain matrix
ΔMV=vector for calculated change in MVs The profit values are positive numbers and the cost values are negative numbers to indicate their influence on the objective. Using this objective function, the LP optimizer 54 calculates the changes in the manipulated variables MV that minimize the objective function while insuring that the control variables CV remain within a range from their target set point, that the auxiliary variables AV are within their upper and lower constraint limits and that the manipulated variables MV are within their upper and lower limits.

In one optimization procedure that can be used, incremental values of manipulated variables are used at the present time (t) and a sum of increments of manipulated variables are used over the control horizon with incremental values of control and auxiliary variables being determined at the end of prediction horizon, instead of positional current values, as is typical in LP applications. Of course, the LP algorithm may be appropriately modified for this variation. In any event, the LP optimizer 54 may use a steady state model and, as a result, a steady state condition is required for its application. With a prediction horizon as normally used in MPC design, future steady state is guaranteed for a self-regulating process. One possible predicted process steady state equation for an m by n input-output process, with prediction horizon p, control horizon c, expressed in the incremental form is:

$$\Delta CV(t+p) = A * \Delta MV(t+c)$$

wherein:

$$\Delta CV(t+p) = \begin{bmatrix} \Delta cv_1 \\ ... \\ \Delta cn_n \end{bmatrix}$$

denotes predicted changes in outputs at the end of prediction horizon (t+p), $$A = \begin{bmatrix} a_{11} \ ... \ a_{1m} \\ ... \\ a_{n1} \ a_{nm} \end{bmatrix}$$

is the process steady state m by n gain matrix, $$\Delta MV(t+c) = \begin{bmatrix} \Delta mv_1 \\ ... \\ \Delta mv_m \end{bmatrix}$$

denotes changes in manipulated variables at the end of control horizon (t+c).

The vector $\Delta MV(t+c)$ represents the sum of the changes over control horizon made by every controller output $mv_i$ so that.

$$\Delta mv_i = \sum_{i=1}^{c} mv_i(t+j) \quad i = 1, 2, ..., m$$

The changes should satisfy limits on both the manipulated variables MV and the control variables CV (here auxiliary variables are treated as control variables):

$$MV_{min} \leq MV_{current} + \Delta MV(t+c) \leq MV_{max}$$

$$CV_{min} \leq CV_{predicted} + \Delta CV(t+p) \leq CV_{max}$$

In this case, the objective function for maximizing product value and minimizing raw material cost can be defined jointly as:

$$Q_{min} = -UCV^T * \Delta CV(t+p) + UMV^T * \Delta MV(t+c)$$

wherein:

UCV is the cost vector for a unit change in the control variable CV process value; and UMV is the cost vector for a unit change in the manipulated variables MV process value.

Applying the first equation above, the objective function can be expressed in terms of manipulated variables MV as:

$$Q_{min} = -UCV^T * A * \Delta MV(t+c) + UMV^T * \Delta MV(t+c)$$

To find an optimal solution, the LP algorithm calculates the objective function for an initial vertex in the region defined by this equation and improves the solution every next step until the algorithm determines the vertex with the maximum (or minimum) value of the objective function as an optimal solution. The determined optimal manipulated variable values are applied as the target manipulated variables $MV_T$ to be achieved within control horizon.

Generally speaking, running the LP algorithm on the prepared matrix returns three possible results. First, there is a unique solution for the target manipulated variables $MV_T$. Second, the solution is unbounded, which should not happen if each control and auxiliary variable has a high and a low limit. Third, there is no solution, which means the boundaries or constraints on the auxiliary variables are too tight. To handle the third case, the overall constraints may be relaxed to obtain a solution. The basic assumption is that limits on manipulated variables (Hi/Lo limits) can not be changed by optimizer. The same is true for constraint or limits of the auxiliary variable (Hi/Lo limits). However, the optimizer can change from driving the control variable CV to the specified set points (CV set point control) to driving the control variables to any of the values within a range from or around the set point (CV range control). In this case, the values of the control variables are allowed to be placed within a range rather than at a specific set point. If there are several auxiliary variables AV violating their constraints, and switching from CV set point control to CV range control does not provide a solution, it is also possible to relax or to ignore the constraints of the auxiliary variables based on the provided weights or priority designations. In one embodiment, a solution could be determined by minimizing the squared error of the auxiliary variables allowing each of them to violate their respective constraint or by abandoning constraints of the auxiliary variables with lowest priority in a sequential manner.

As noted above, the objective function OF may be chosen or set by default by the control block generation program 40. One method of establishing such a default setting is provided below. In particular, while it is desirable to provide the ability to optimize, many situations may only require that set points for the control variables be maintained in a manner that still observes the operating constraints of the auxiliary variables and manipulated variables. For these applications, the block 38 may be configured to operate solely as an MPC function block. To provide this ease of use, a default "Operate" objective function may be automatically created with default costs assigned to the different variables therein along with default auxiliary variable AV weights. These defaults may set all costs for the auxiliary variables AV and the manipulated variables MV equal or provide some other predetermined cost assignment to the auxiliary and manipulated variables AV and MV. When an expert option is selected, then the user may create additional optimization selections and define their associated costs for the different objective functions 64. The expert user will also be allowed to modify the default auxiliary variable and control variable AV and CV weights of the default objective function.

In one embodiment when, for example, economics are not defined for the process configuration, the objective function may be constructed from the MPC configuration automatically. In general, the objective function may be constructed using the following formula.

$$CD^T = C^T + P^T * A$$

$$= [C_1, \ldots, C_j, \ldots, C_m] + \left[\sum_{i=1}^{n} p_i a_{i1}, \sum_{i=1}^{n} p_i a_{i2}, \ldots, \sum_{i=1}^{n} p_i a_{im}\right]$$

$$= [CD_1, \ldots, CD_j, \ldots, CD_m]$$

The variables $C_j$ and $p_j$ can be defined from the configuration settings. In particular, assuming that the control variable CV set point can be defined at LL or HL only, the $p_j$ value is defined in the following way:

$p_j = -1$ if set point is defined at LL or minimize was selected; and $p_j = 1$ if set point is defined at HL or maximize was selected.

Assuming no configuration information is entered for the auxiliary variables AV, $p_j = 0$ for all auxiliary variables AV. Similarly for the manipulated variables MV, the $C_j$ value depends on whether or not the preferred manipulated variable target $MV_T$ is defined.

Where the preferred manipulated target $MV_T$ is defined:

$C_j = 1$ if $MV_T$ is at the HL (high limit) or maximize was selected, $C_j = -1$ if $MV_T$ is at the LL (low limit) or minimize was selected, and $C_j = 0$ if $MV_T$ is not defined.

If desired, the selection of the use of the optimizer 54 in conjunction with the MPC controller 52 may be adjustable to thereby provide a degree of optimization. To perform this function, the change in the manipulated variables MV used by the controller 52 can be altered by applying different weights to the change in the manipulated variables MV determined by the MPC controller 52 and the optimizer 54. Such a weighted combination of the manipulated variables MV is referred to herein as an effective MV ($MV_{eff}$). The effective $MV_{eff}$ can be determined as:

$$\Delta MV_{eff} = \Delta MV_{mpc}(1+\alpha/S) + \Delta MV_{opt}(1-\alpha) \quad 0 < \alpha < 1$$

where S is arbitrarily or heuristically selected. Typically, S will be greater than one and may be in the range of ten.

Here, with $\alpha = 1$, the optimizer contributes to the effective output as it was set at the generation. With $\alpha = 0$, the controller provides MPC dynamic control only. Of course, the range between 0 and 1 provides different contributions of optimizer and MPC control.

The above described default objective function may be used to establish the operation of the optimizer during different possible operational modes thereof. In particular, when the number of control variables CVs match the number of manipulated variables MVs, the expected behavior with the default setting is that the control variable CV set points will be maintained as long as auxiliary variables AVs and the manipulated variables MVs are projected to be within their limits. If it is predicted that an auxiliary variable or a manipulated variable will violate its limit, then the control variable working set points will be changed within their range to prevent these limits from being violated. If, in this case, the optimizer 54 can not find a solution that satisfies auxiliary and manipulated variable limits while maintaining the control variables within their range, then control variables will be maintained within their range while the auxiliary variables are allowed to deviate from their constraint limits. In finding the best solution, those auxiliary variables AVs that are projected to violate a limit will be treated equally and their average limit deviation minimized.

To achieve this behavior, the default cost/profit used by the objective function will automatically be set such that the control variables CV will be assigned a profit of 1 if the range is defined to allow deviation below the set point and a profit of −1 if the range is defined to allow deviation above the set point. The auxiliary variables AVs within limits will be assigned a profit of 0 and the manipulated variables MVs will be assigned a cost of 0.

When the number of control variables CVs is less than number of manipulated variables MVs, then the extra degrees of freedom can be used to address the requirements associated with the configured manipulated variable's MV final resting position. Here, the control variable set points (if any control variables CVs are defined) will be maintained as long as the auxiliary and manipulated variables are projected to be within their limits. The average deviation of the manipulated variables from the configured final resting position will be minimized. If it is predicted that one or more of the auxiliary and manipulated variables will violate its limit, then the control variable working set points will be changed within their ranges to prevent these limits from being violated. Under this condition, if multiple solutions exist, then the one used for the control will minimize the average deviation of the manipulated variables from configured the final resting position.

When the optimizer 54 can not find a solution (i.e., a solution does not exist) that satisfies the auxiliary and manipulated variables limits while maintaining the control variables within their range, then the control variables will be maintained within range while the auxiliary variables are allowed to deviate from their constraint limits. In finding the best solution, those auxiliary variables that are projected to violate a limit will be treated equally and their average limit deviation minimized. To achieve this behavior, the default cost/profit used by objective function will automatically be set so that the control variables will be assigned a profit of 1 if the range is defined to allow deviation below the set point and −1 if the range is defined to allow deviation above the set point. The auxiliary variables will be assigned a profit of 1 or −1 and the manipulated variables will be assigned a cost of 0.1.

In any event, after operation, the optimizer 54 provides the set of optimal or target manipulated variables $MV_T$ to the target conversion block 55 which uses the steady state gain matrix to determine the target steady state control and manipulated variables that result from the target manipulated variables $MV_T$. This conversion is computationally straightforward, as the steady state gain matrix defines the interactions between the manipulated variables and the control and auxiliary variables and thereby can be used to uniquely determine the target manipulated and auxiliary variables $CV_T$ and $AV_T$ from the defined target (steady state) manipulated variables $MV_T$.

Once determined, at least of a subset of N of the target control and auxiliary variables $CV_T$ and $AV_T$ are provided as inputs to the MPC controller 52 which, as noted previously, uses these target values $CV_T$ and $AV_T$ to determine a new set of steady state manipulated variables (over the control horizon) $MV_{SS}$ which drives the current control and manipulated variables CV and AV to the target values $CV_T$ and $AV_T$ at the end of the control horizon. Of course, as is known, the MPC controller changes the manipulated variables in steps in an attempt to reach the steady state values for these variables $MV_{SS}$ which, theoretically, will be the target manipulated variables $MV_T$ determined by the optimizer 54. Because the optimizer 54 and MPC controller 52 operate as described above during each process scan, the target values of the manipulated variables $MV_T$ may change from scan to scan and, as a result, the MPC controller may never actually reach any particular one of these sets of target manipulated variables $MV_T$, especially in the presence of noise, unexpected disturbances, changes in the process 50, etc. However, the optimizer 54 is always driving the controller 52 to move the manipulated variables MV towards an optimal solution.

As is known, the MPC controller 52 includes a control prediction process model 70, which may be an N by M+D step response matrix (where N is the number of control variables CV plus the number of auxiliary variables AV, M is the number of manipulated variables MV and D is the number of disturbance variables DV). The control prediction process model 70 produces on an output 72 a previously calculated prediction for each of the control and auxiliary variables CV and AV and a vector summer 74 subtracts these predicted values for the current time from the actual measured values of the control and auxiliary variables CV and AV to produce an error or correction vector on the input 76.

The control prediction process model 70 then uses the N by M+D step response matrix to predict a future control parameter for each of the control variables and auxiliary variables CV and AV over the control horizon based on the disturbance and manipulated variables provided to other inputs of the control prediction process model 70. The control prediction process model 70 also provides the predicted steady state values of the control variables and the auxiliary variables $CV_{SS}$ and $AV_{SS}$ to the input processing/filter block 58.

A control target block 80 determines a control target vector for each of the N target control and auxiliary variables $CV_T$ and $AV_T$ provided thereto by the target conversion block 55 using a trajectory filter 82 previously established for the block 38 In particular, the trajectory filter provides a unit vector defining the manner in which control and auxiliary variables are to be driven to their target values over time. The control target block 80 uses this unit vector and the target variables $CV_T$ and $AV_T$ to produce a dynamic control target vector for each of the control and auxiliary variables defining the changes in the target variables $CV_T$ and $AV_T$ over time period defined by the control horizon time. A vector summer 84 then subtracts the future control parameter vector for each of the control and auxiliary variables CV and AV from the dynamic control vectors to define an error vector for each of the control and auxiliary variables CV and AV, The future error vector for each of the control and auxiliary variables CV and AV is then provided to the MPC algorithm which operates to select the manipulated variable MV steps that minimize the, for example, least squared error, over the control horizon. Of course, the MPC algorithm or controller uses an M by M process model or control matrix developed from relationships between the N control and auxiliary variables input to the MPC controller 52 and the M manipulated variables output by the MPC controller 52.

More particularly, the MPC algorithm working with the optimizer has two main objectives. First, the MPC algorithm tries to minimize CV control error with minimal MV moves, within operational constraints and, second, tries to achieve optimal steady state MV values set up by optimizer and the target CV values calculated directly from the optimal steady state MV values.

To satisfy these objectives, the original unconstrained MPC algorithm can be extended to include MV targets into the least square solution. The objective function for this MPC controller is:

$$\min_{\Delta MV(k)} \left\{ \|\Gamma^y [CV(k) - R(k)]\|^2 + \|\Gamma^u \Delta MV(k)\|^2 + \|\Gamma^o [\sum \Delta MV(k) - \Delta MVT]\|^2 \right\}$$

wherein:
  CV(k) is the controlled output p-step ahead prediction vector;
  R(k) is the p-step ahead reference trajectory (set point) vector;
  $\Delta MV(k)$ is the c-step ahead incremental control moves vector;
  $\Gamma^y = \text{diag}\{\Gamma^y_1, \ldots, \Gamma^y_p\}$ is a penalty matrix on the controlled output error;
  $\Gamma^u = \text{diag}\{\Gamma^u_1, \ldots, \Gamma^u_c\}$ is a penalty matrix on the control moves;
  p is the prediction horizon (number of steps);
  c is the control horizon (number of steps); and
  $\Gamma^o$ is a penalty on error of the sum of controller output moves over control horizon relative to the target optimal change of MV defined by the optimizer. For the simplicity of notation, the objective function is shown for single-input/single-output (SISO) control.

As will be understood, the first two terms are the objective function for the unconstrained MPC controller while the third term sets up an additional condition that makes the sum of the controller output moves equal to the optimal targets. In other words, the first two terms set up objectives for controller dynamic operation while the third term sets up steady state optimization objectives.

It will be noted that the general solution for this controller, similar to that for the unconstrained MPC controller, can be expressed as:

$$\Delta MV(k) = (S^{u^T} \Gamma^T \Gamma S^u + \Gamma^{u^T} \Gamma^u)^{-1} S^{u^T} \Gamma^T \Gamma E_{p+1}(k) = K_{ompc} E_{p+1}(k)$$

wherein:
  $\Delta MV(k)$ is the change in MPC controller output at the time k;
  $K_{ompc}$ is the optimized MPC controller gain;
  $S^u$ is the process dynamic matrix built from the step responses of dimension p×c for a SISO model and p*n×c*m for a multiple-input/multiple-output MIMO model with m manipulated inputs and n controlled outputs.

For optimized MPC, the dynamic matrix is extended to the size: (p+1)×m for SISO model and (p+m)*n×c*m for MIMO model, to accommodate the MV error. $E_{p+1}(k)$ is the CV error vector over the prediction horizon and error of the sum of controller output moves over control horizon relative to the target optimal change of MV. The matrix $\Gamma$ combines the matrix $\Gamma^y$ and $\Gamma^o$ and is a square matrix of dimension (p+1) for a SISO controller and [n(p+m)] for the multivariable controller. Superscript T denotes a transposed matrix.

It has been determined that, because the optimizer 54 is optimizing based on all of the control and auxiliary variables CV and AV to determine a target set of manipulated variables $MV_T$ defining a unique optimal operating point, it does not matter that the MPC controller 52 is only operating using a subset of the control and auxiliary variables CV and AV in its control matrix to actually produce the manipulated variables MV output therefrom because, when the controller 52 drives the selected subset of control and auxiliary variables CV and AV to their associated targets, the others of the complete set of control and auxiliary variables will be at their target values as well. As a result, it has been determined that a square (M by M) MPC controller with an M by M control matrix can be used with an optimizer that uses a rectangular (N by M) process model to perform process optimization. This enables standard MPC control techniques to be used with standard optimization techniques without having to invert a non-square matrix with the attendant approximations and risks associated with such conversion techniques in a controller.

In one embodiment, when the MPC controller is squared, i.e., the number of manipulated variables MV is equal to the number of control variables CV, then the manipulated variable MV target can be effectively achieved by changes in CV values as follows:

$\Delta CV = A * \Delta MVT$ $\Delta MV_T$—optimal target change of MV $\Delta CV$—CV change to achieve optimal MV. CV change is implemented by managing CV set points.

In operation, the optimizer 54 sets up and updates the steady state targets for the MPC unconstrained controller at every scan. Thus, the MPC controller 52 executes the unconstrained algorithm. Because the targets $CV_T$ and $AV_T$ are set in a manner that accounts for constraints, as long as a feasible solution exists, the controller works within constraint limits. Optimization, therefore, is an integral part of the MPC controller.

Figure 3:
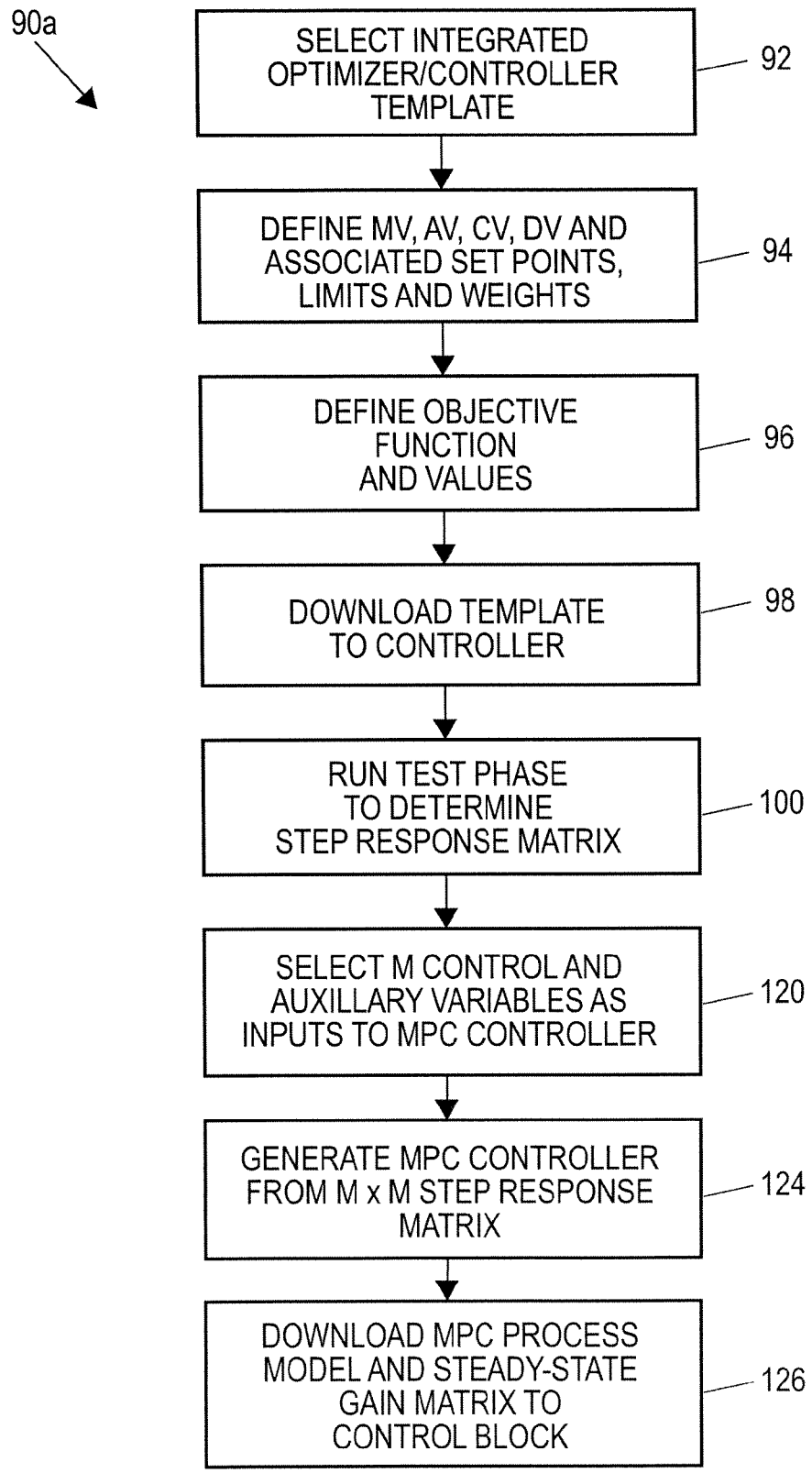
FIG. 3 is a flow chart illustrating a manner of creating and installing the integrated optimizer and MPC controller function block of FIG. 2.
Figure 4:
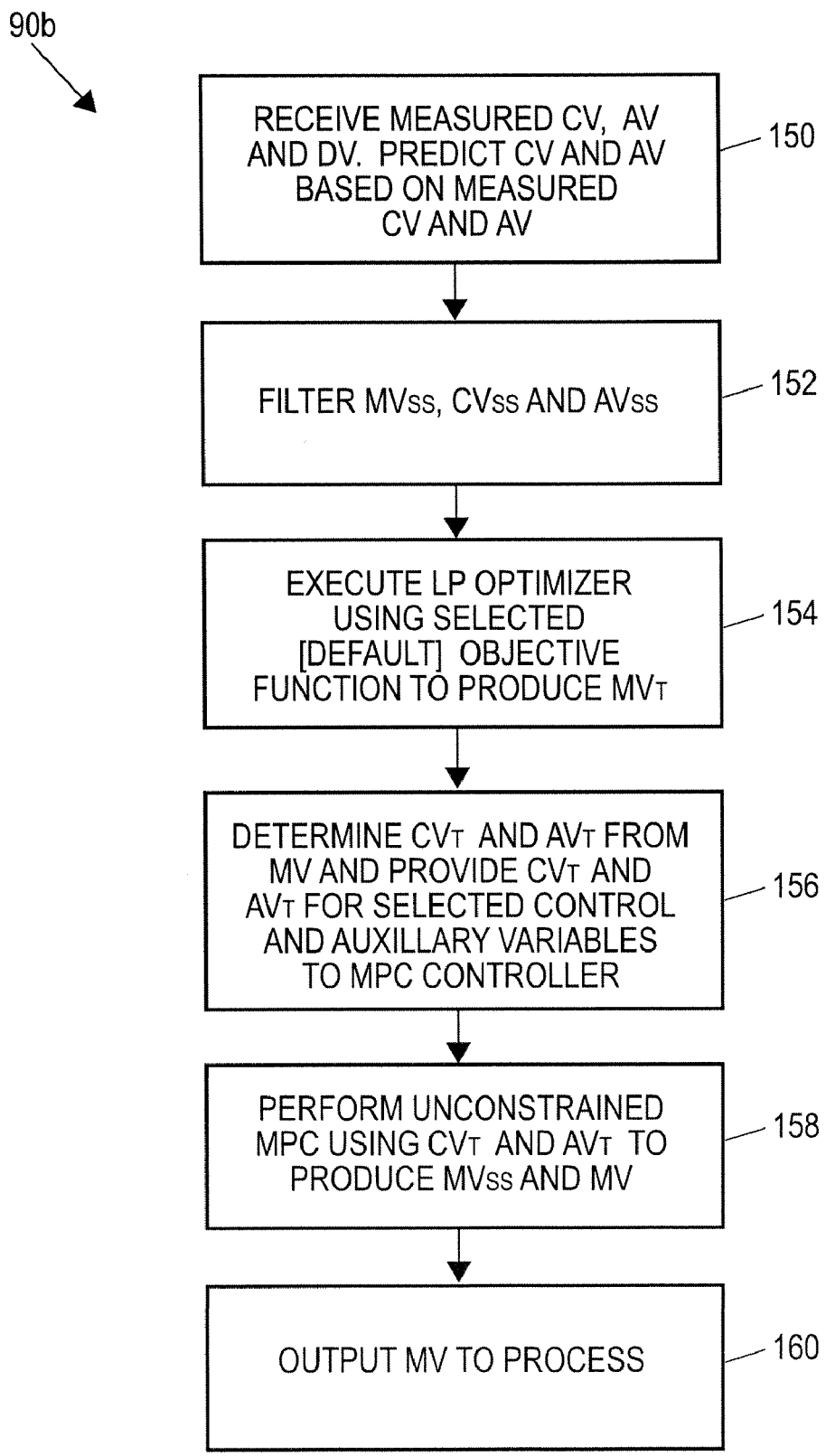
FIG. 4 is a flow chart illustrating the operation of the integrated optimizer and MPC controller of FIG. 2 during on-line process operation.

FIGS. 3 and 4 depict a flow chart 90 illustrating the steps used to perform integrated model predictive control and optimization. The flow chart 90 is generally divided into two sections 90a (FIG. 3) and 90b (FIG. 4) illustrating functions which occur prior to process operation (90a) and functions which occur during process operation (90b), e.g., during every scan of process operation. Prior to process operation, an operator or engineer takes a number of steps to create the advanced control block 38 including an integrated MPC controller and optimizer. In particular, at a block 92, an advanced control template may be selected for use as the advanced control block 38. The template may be stored in and copied from a library within a configuration application on the user interface 13 and may include the general mathematics and logic functions of the MPC controller routine 52 and optimizer 54 without the particular MPC, process models and steady state gain or control matrices and the particular objective function. This advanced control template may be placed in a module having other blocks, such as input and output blocks configured to communicate with devices within the process 50, as well as other types of function blocks, such as control blocks, including PID, neural network and fuzzy logic control blocks. It will be understood that, in one embodiment, the blocks within a module are each objects within an object oriented programming paradigm having inputs and outputs thereof connected to each other to perform communications between the blocks. During operation, the processor running the module executes each of the blocks in sequence at a different time using the inputs to the blocks to produce the outputs of the blocks which are then provided to the inputs of other blocks as defined by the specified communication links between the blocks.

Figure 5:
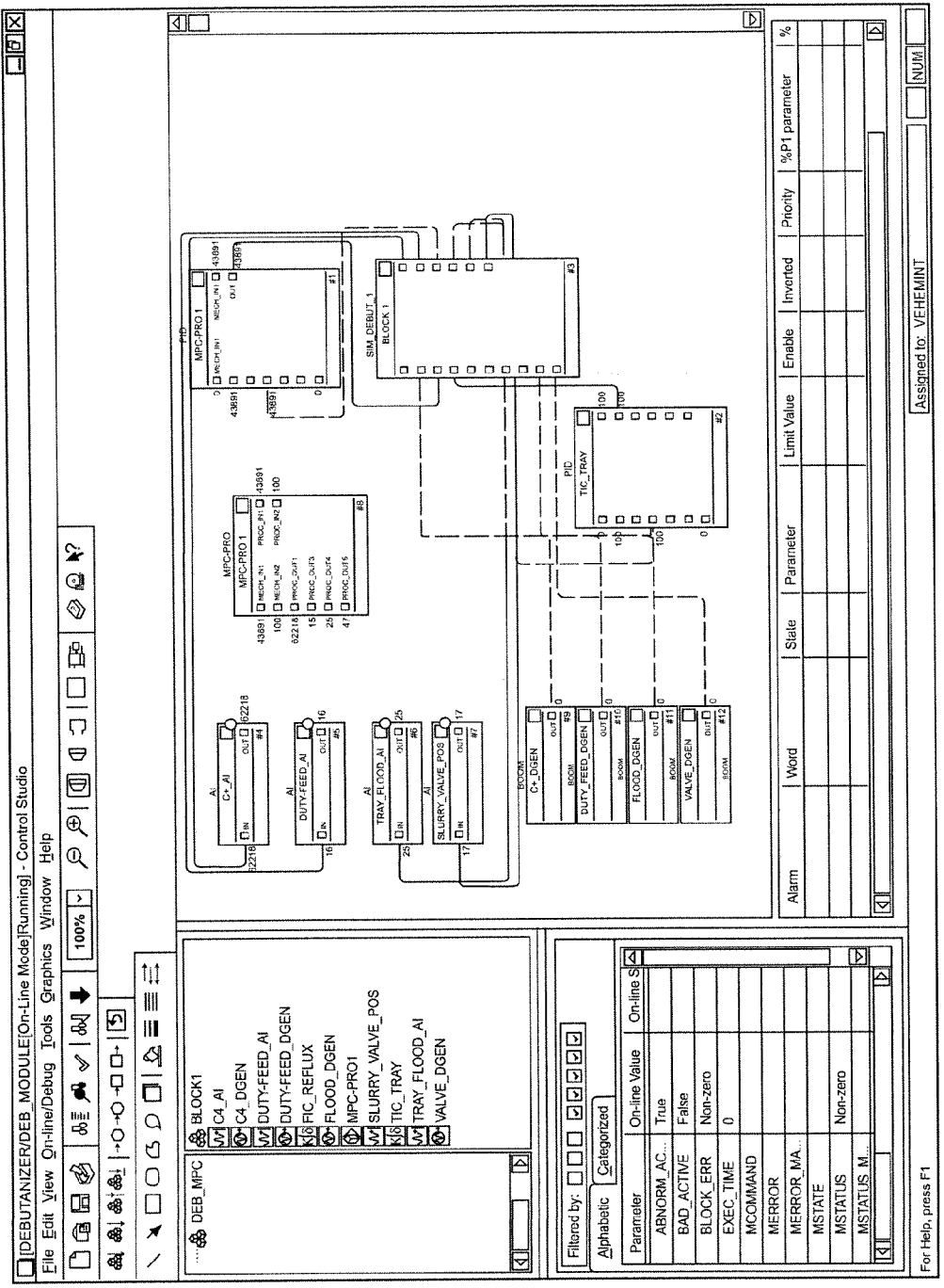
FIG. 5 is a screen display of a configuration routine illustrating an advanced control block within a control module that performs process control.

At a block 94, the operator defines the particular manipulated variables, control variables, constrained variables and disturbance variables to be used in the block 38. If desired, in a configuration program, such as the program 40 of FIG. 1, the user may view the control template, select inputs and outputs to be named and configured, browse using any standard browser within the configuration environment to find the actual inputs and outputs within the control system and select these actual control variables as the input and output control variables for the control template. FIG. 5 illustrates a screen display created by a configuration routine depicting a control module DEB_MPC having a number of interconnected function blocks including a number of AI (analog input) and AO (analog output) function blocks, a number of PID control function blocks and an MPC-PRO function block which is an advanced function block. The tree structure on the left hand side of the display of FIG. 5 illustrates the function blocks within the DEB_MPC module including, for example, Block 1, C4_AI, C4_DGEN, etc.

Figure 6:
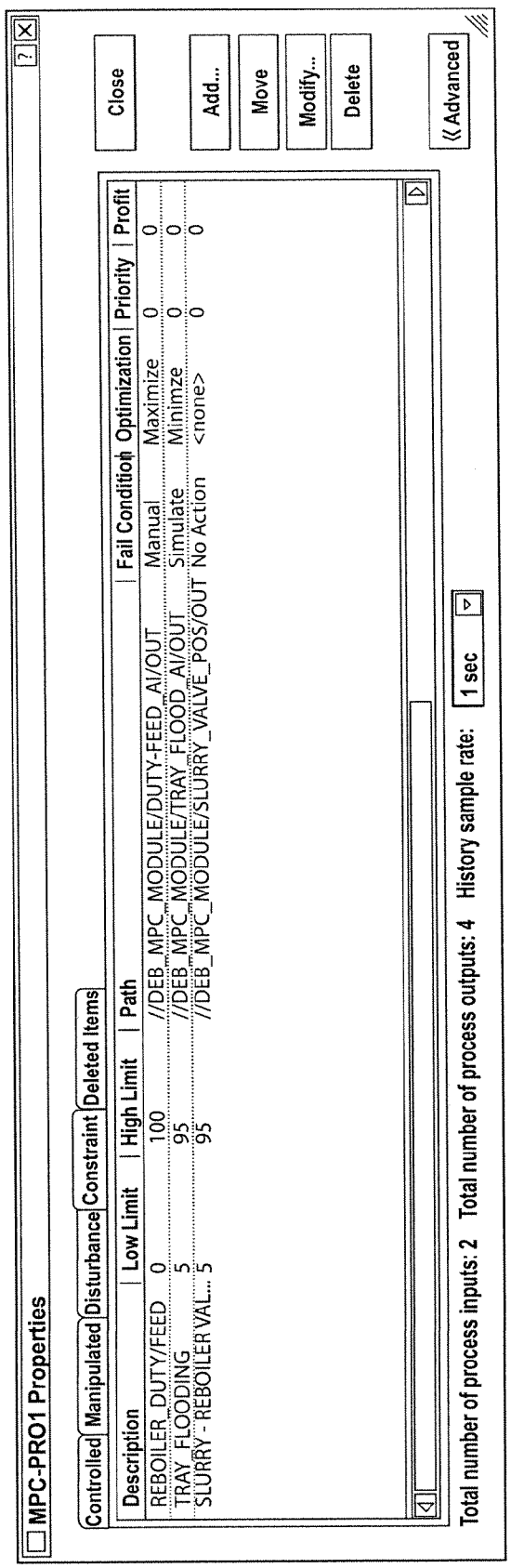
FIG. 6 is a screen display of a configuration routine illustrating a dialog box indicating the properties of the advanced control block of FIG. 5.

As will be understood, the user can specify the inputs to and the outputs from the MPC-PRO function block by drawing lines between these inputs and outputs and the inputs and outputs of other function blocks. Alternatively, the user may select the MPC-PRO block to obtain access to the properties of the MPC-PRO block. A dialog box, such as that of FIG. 6, may be displayed to enable a user to view the properties of the MPC-PRO block. As illustrated in FIG. 6, a different tab may be provided for each of the controlled, manipulated, disturbance and constraint (auxiliary) variables to provide organization of these variables which is particularly necessary when numerous variables such as 20 or more of each, are associated with the advanced control block 38. Within the tab for a particular type of variable, a description, low and high limit (constraints) and path name may be provided. In addition, the user or operator can specify what the block is to do in the case of a failed condition on the variable, such as to take no action, use the simulated value of the variable instead of the measured value or accept a manual input. Still further, the operator can specify whether this variable is to minimized or maximized to perform optimization and the priority or weight and profit values associated with this variable. These fields must be filled in when the default objective function is not being used. Of course the user may add, move, modify or delete information or variables using the appropriate buttons on the rights side of the dialog box.

Figure 7:
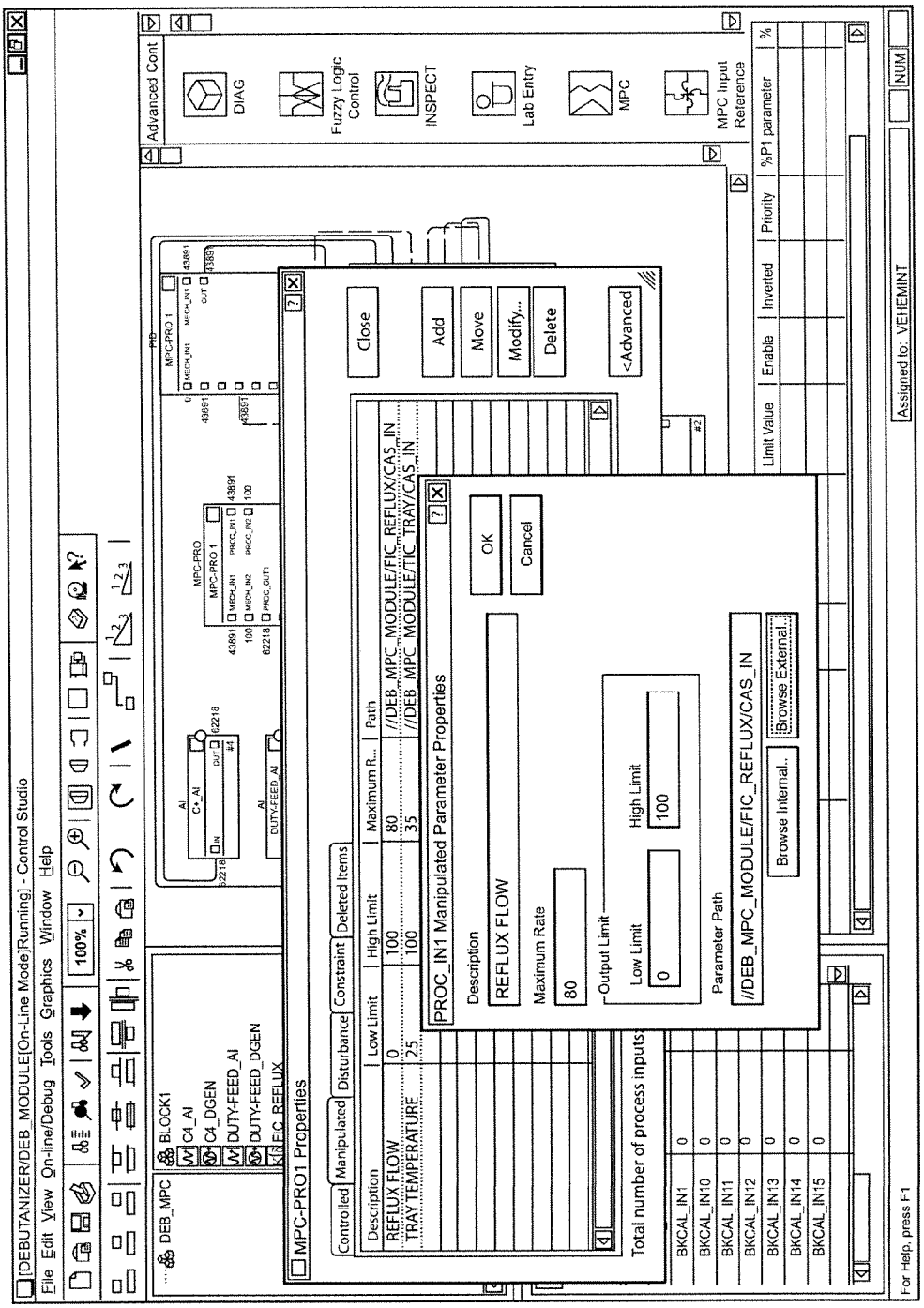
FIG. 7 is a screen display of a configuration routine illustrating a manner of selecting or specifying inputs to and outputs of an advanced control function block depicted n the display of FIG. 5.

The user may specify or change the information for one or more of the variables by selecting the variable. In this case, a dialog box, such as that of FIG. 7 for the REFLUX FLOW manipulated variable, may be presented to the user. The user may change the information within the different boxes thereof and may specify information, such as path name of the variable (i.e., its input or output connection) by browsing. Using the screen of FIG. 7, the user may select an internal browse button or an external browse button to browse within the module or externally to the module in which the MPC-PRO block is located. Of course, if desired, the operator or user could manually provide an address, path name, tag name, etc. defining the connections to and from the inputs and outputs of the advanced control block if so desired.

Figure 8:
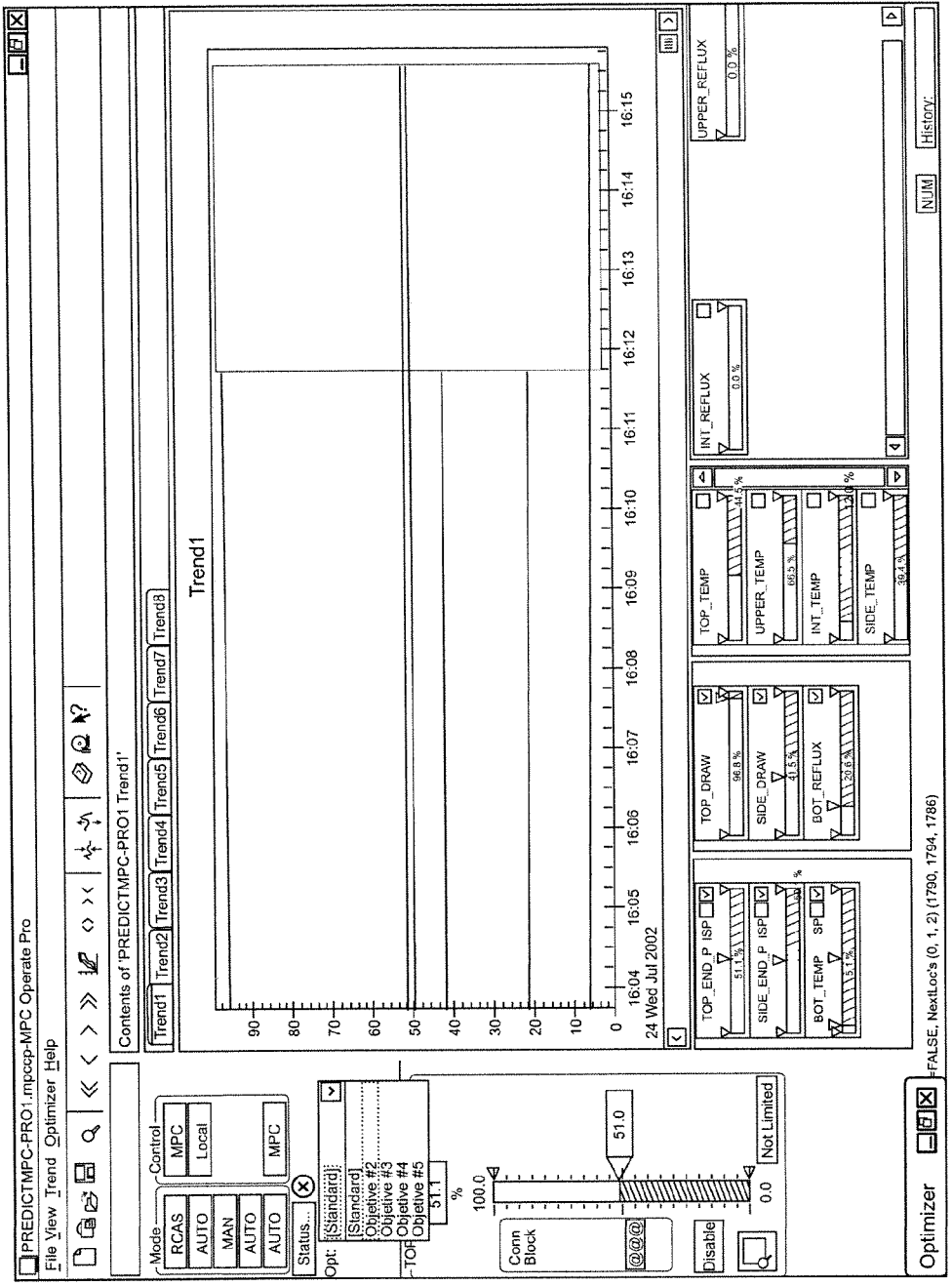
FIG. 8 is a screen display provided by a configuration routine that enables a user or operator to select one of a set of objective functions for use creating an advanced control block.

After selecting the inputs and outputs to the advanced control function block, the user may define the set points associated with the control variables, the ranges or limits associated with the control variables, the auxiliary variables, and the manipulated variables, and the weights associated with each of the control, auxiliary and manipulated variables. Of course, some of this information, such as constraint limits or ranges may already be associated with these variables as these variables are selected or found within the process control system configuration environment. If desired, at a block 96 of FIG. 3, the operator may configure the one or more objective functions to be used within the optimizer by specifying the unit costs and/or profits for each of the manipulated variables, the control variables and the auxiliary variables. Of course, at this point, the operator may select to use the default objective function as described above. FIG. 8 is a screen display provided by a configuration routine that enables a user or operator to select one of a set of objective functions for use creating an advanced control block. As will be understood, the user can use the screen display such as that provided by FIG. 8 to select of a set of previously stored objective functions, here illustrated as a Standard objective function and Objective Functions 2-5.

After the inputs (control, auxiliary and disturbance variables) are named and tied to the advanced control template and the weights, limits and setpoints are associated therewith, at a block 98 of FIG. 3, the advanced control template is downloaded into a selected controller within the process as a function block to be used for control. The general nature of the control block, and the manner of configuring this control block is described in U.S. Pat. No. 6,445,963, entitled "Integrated Advanced Control Blocks in Process Control Systems," which is assigned to the assignee hereof and which is hereby expressly incorporated by reference herein. While this patent describes the nature of creating an MPC controller within a process control system and does not discuss the manner in which an optimizer can be connected to that controller, it will be understood that the general steps taken to connect and configure the controller can be used for the control block 38 described herein with the template including all of the logic elements discussed herein for the control block 38 instead of just those described in this patent.

In any event, after the advanced control template is downloaded into the controller, the operator may, at a block 100, select to run a test phase of the control template to generate the step response matrix and the process model to be used within the MPC controller algorithm. As described in the patent identified above, during the test phase, control logic within the advanced control block 38 provides a series of pseudo-random waveforms to the process as the manipulated variables and observes the changes in the control and auxiliary variables (which are treated by the MPC controller essentially as control variables). If desired, the manipulated and disturbance variables, as well as the control and auxiliary variables may be collected by the historian 12 of FIG. 1 and the operator may set up the configuration program 40 (FIG. 1) to obtain this data from the historian 12 and to perform trending on this data in any manner to obtain or determine the matrix of step responses, each step response identifying the response in time of one of the control or auxiliary variables to a unit change in one (and only one) of the manipulated and control variables. This unit change is generally a step change, but could be another type of change such as an impulse or ramped change. On the other hand, if desired, the control block 38 may generate the step response matrix in response to the data collected when applying the pseudo-random waveforms to the process 50 and then provide these waveforms to the operator interface 13 being used by the operator or user creating and installing the advanced control block 38.

Figure 9:
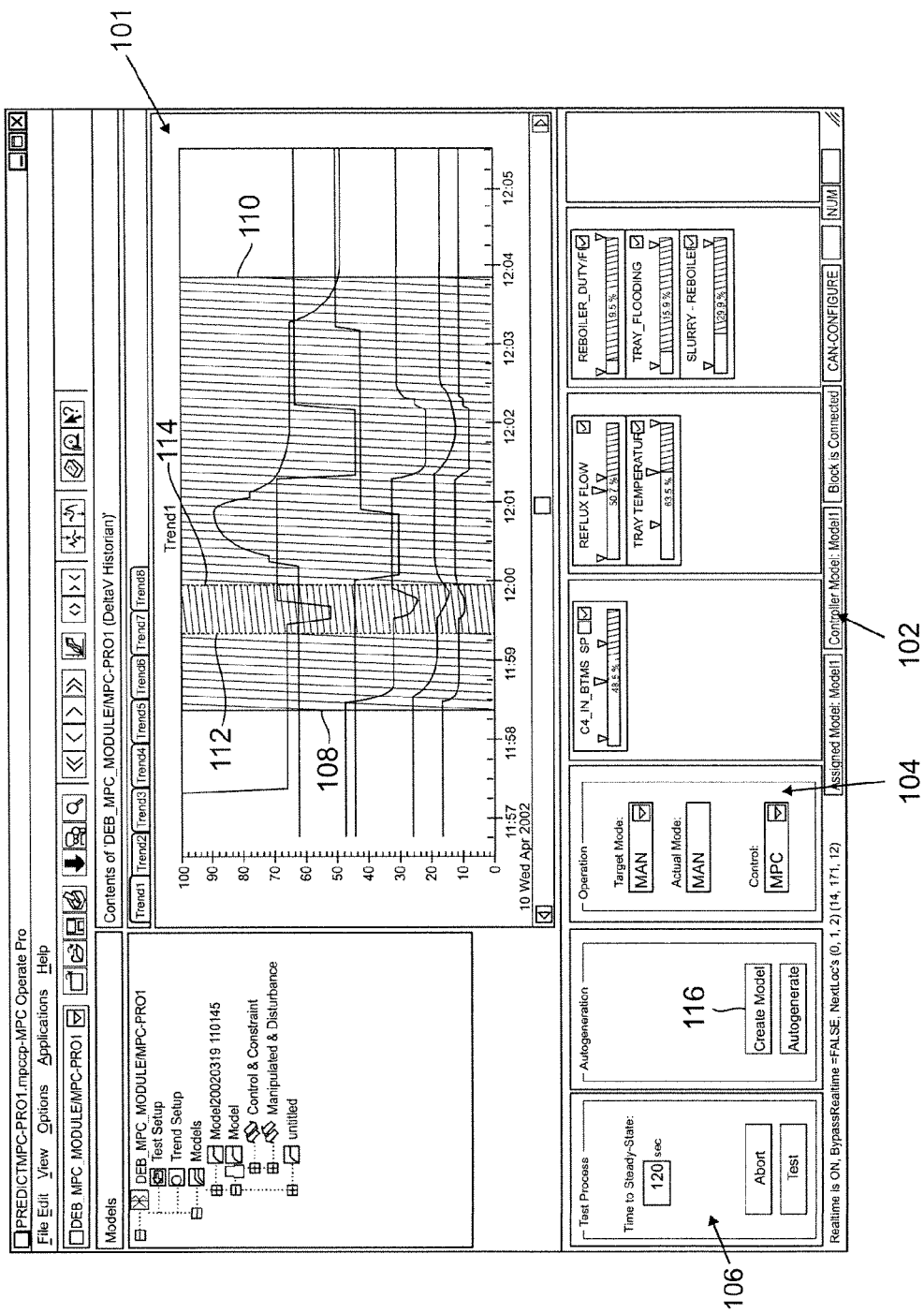
FIG. 9 is a screen display of a test screen that may be used to enable a user to perform testing and creation of a process model during the creation of an advanced control block.

FIG. 9 illustrates a screen display that may be provided by the test routine to provide the operator with plots of the collected and trended data which enable the operator to direct the creation of the step response curves and, therefore, the process model or control matrix used in the MPC controller of the advanced control block. In particular, a plot region 101 plots the data for a number of inputs or outputs or other data (as previously specified by the operator) in response to the test waveforms. A bar graph region 102 provides a bar graph for each of the trended data variables illustrating for each of the variables being trended, the name of the variable, the current value of the variable in bar graph form, a set point where applicable (indicated by a larger triangle above the bar graph), and limits where applicable (indicated by smaller triangles above the bar graph). Other areas of the display illustrate other things about the advanced control block, such as the target and actual mode of the block (104) and the configured time to steady state (106).

Prior to creating a process model for the advanced control block, the operator may graphically specify the data to be used from the trending plots 101. In particular, the operator may specify beginning and ending points 108 and 110 of the plot 102 as the data to be used to create the step response. The data in this area may be shaded a different color, such as green, to visually indicate the selected data. Likewise, the operator may specify areas within this shaded area to be excluded (as being non-representative, an effect of noise or an unwanted disturbance, etc.). This area is illustrated between the lines 112 and 114 and may be shaded, for example, in red to indicate that this data is not to be included in the generation of the step responses. Of course, the user could include or exclude any desired data and may perform these functions for each of a number of trend plots (FIG. 9 illustrates that eight trend plots are available in this case), with the different trend plots being associated with, for example, different manipulated variables, control variables, auxiliary variables, etc.

To create a set of step responses, the operator may select the create model button 116 on the screen display of FIG. 9 and the creation routine will use the selected data from the tend plots to generate a set of step responses, with each step response indicating the response of one of the control or auxiliary variables to one of the manipulated or disturbance variables. This generation process is well known and will not be described herein in any further detail.

After the step response matrix is created, in the case in which the control and auxiliary variables outnumber the manipulated variables, the step response matrix is used to select the subset of control and auxiliary variables that will be used within the MPC algorithm as the M by M process model or control matrix to be inverted and used within the MPC controller 52. This selection process may be performed manually by the operator or automatically by a routine within, for example, the user interface 13 having access to the step response matrix. Generally speaking, a single one of the control and auxiliary variables will be identified as being the most closely related to a single one of the manipulated variables. Thus, a single and unique (i.e., different) one of the control or auxiliary variables (which are inputs to the process controller) will be associated with each of the different manipulated variables (which are the outputs of the process controller) so that that the MPC algorithm can be based on a process model created from an M by M set of step responses.

In one embodiment which uses a heuristic approach in providing pairing, the automatic routine or the operator will select the set of M (where M equals the number of manipulated variables) control and auxiliary variables in an attempt to select the single control or auxiliary variable that has some combination of the largest gain and fastest response time to a unit change in a particular one of the manipulated variables and pair these two variables. Of course, in some cases, a particular control or auxiliary variable may have a large gain and fast response time to multiple manipulated variables. Here, that control or auxiliary variable may be paired with any of the associated manipulated variables and may, in fact, be paired with a manipulated variable that does not produce the largest gain and fastest response time because, in the aggregate, the manipulated variable that causes the lesser gain or slower response time may not effect any other control or auxiliary variable to an acceptable degree. Thus, the pairs of manipulated variables on the one hand and the control or auxiliary variables on the other hand are chosen to, in an overall sense, pair the manipulated variables with the subset of control and auxiliary variables that represent the most responsive control variables to the manipulated variables. Still further, it doesn't matter if all of the control variables are not selected as one of the subset of M control and auxiliary variables and that, therefore, the MPC controller does not receive all of the control variables as inputs thereto, because the set of control and auxiliary variable targets are chosen by the optimizer to represent an operating point of the process at which the non-chosen control (as well as the non-chosen auxiliary) variables are at their set point or within their provided range of operation.

Of course, because there may be tens and even hundreds of control and auxiliary variables on the one hand and tens or hundreds of manipulated variables on the other hand, it can be difficult to select the set of control variables and auxiliary variables that have the best response to each of the different manipulated variables, at least from a visualization standpoint. To overcome this problem, the advanced control block generation routine 40 within the operator interface 13 may include or present a set of screen displays to the user or operator to help or enable the operator to make appropriate selections of the control and auxiliary variables that should be used as the subset of control and auxiliary variables to be used in the MPC controller 52 during operation.

Figure 10:
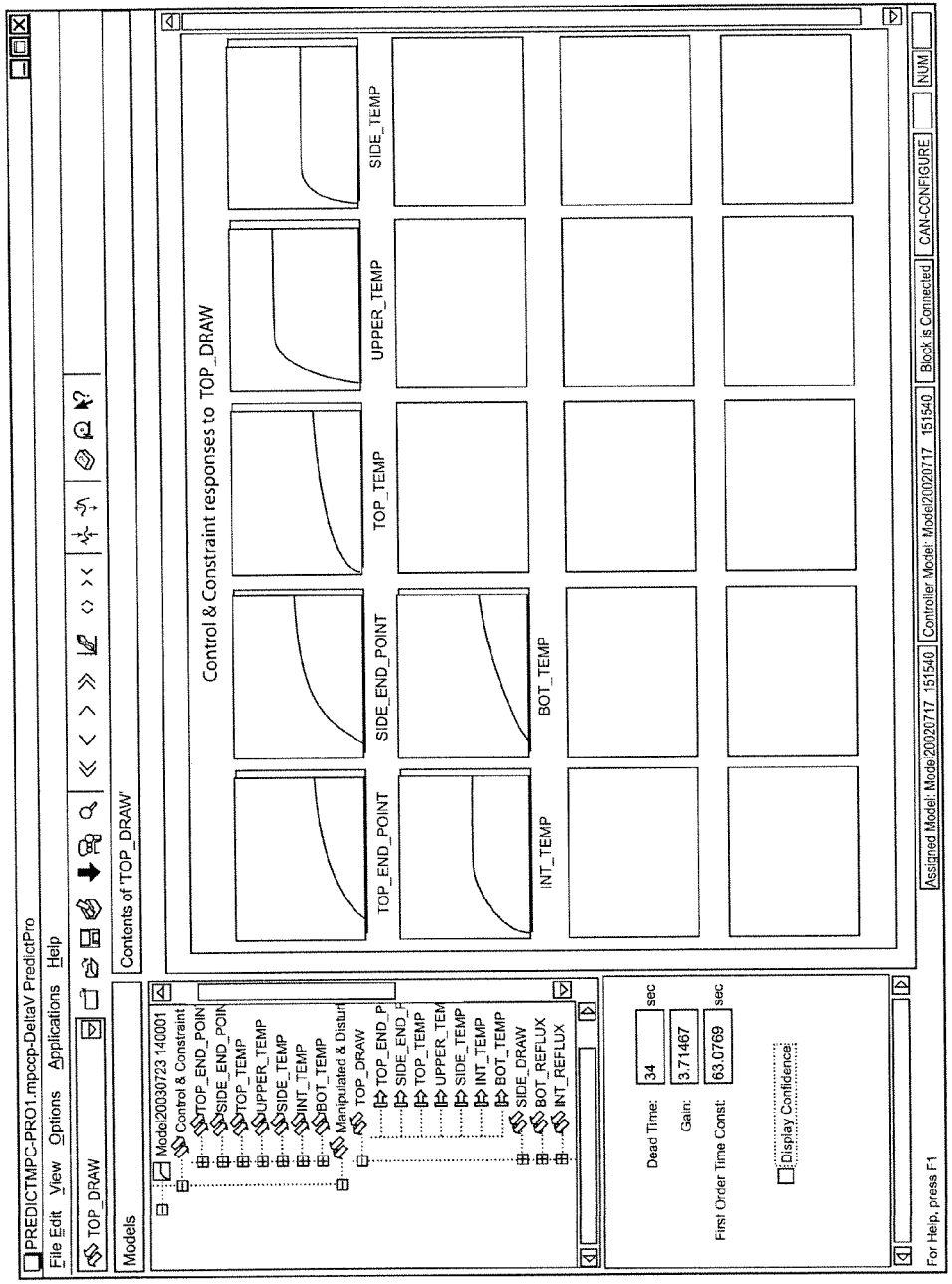
FIG. 10 is a screen display of a configuration routine illustrating a number of step responses indicating the response of different control and auxiliary variables to a particular manipulated variable.
Figure 11:
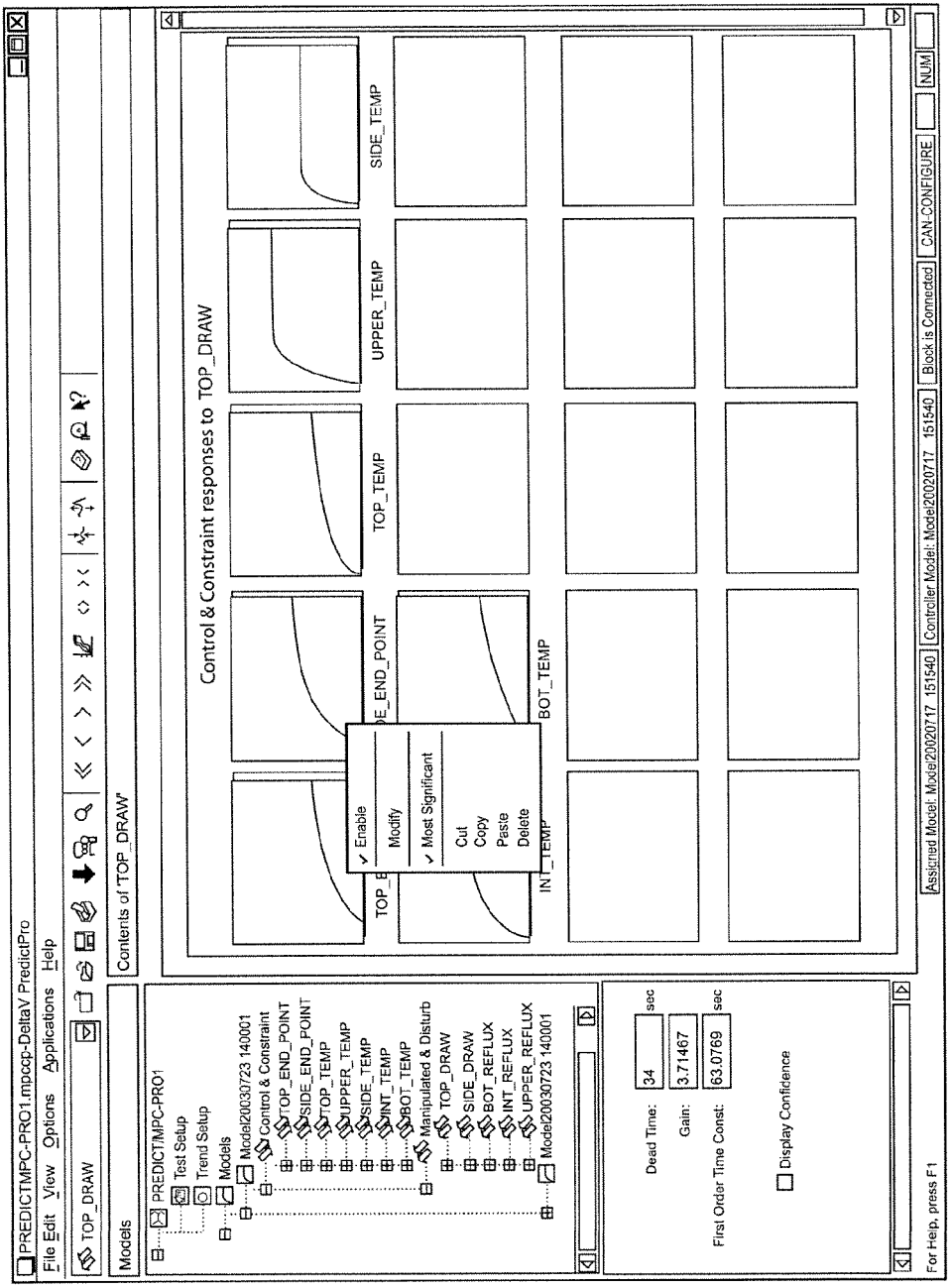
FIG. 11 is a screen display of a configuration routine illustrating a manner of selecting one of the control or auxiliary variables of FIG. 9 as being primarily associated with the manipulated variable.

Thus, at a block 120 illustrated in FIG. 3, the operator may be presented with a screen in which the operator can view the response of each of the control and auxiliary variables to a particular or selected one of the manipulated variables. Such a screen is illustrated in FIG. 10 depicting the response of each of a number control and auxiliary (labeled as constraint) variables to a manipulated variable called TOP_DRAW. The operator may scroll through the manipulated variables, one at a time, and view the step responses of each of the control and auxiliary variables to each of the different manipulated variables and, during the process, select the one control or auxiliary variable that is best responsive to that manipulated variable. Typically, the operator will try to choose the control or manipulated variable that has the best combination of the highest steady state gain and the fastest response time to the manipulated variable. As illustrated in FIG. 11, one of the control and auxiliary variables may be chosen as the most significant for this manipulated variable using a dialog box. If desired, as illustrated in FIG. 11, the selected one of the control and auxiliary variables may be highlighted in a different color, such as red, while previously selected ones (i.e., control and auxiliary variables that have been chosen for other manipulated variables may be highlighted in a different color, such as yellow). In this embodiment, the control routine 40, which of course stores the previously selected control and auxiliary variables in a memory, may check to assure that the operator does not select the same control or manipulated variable as being associated with two different manipulated variables. If the user or operator selects a control or auxiliary variable that has already been selected for another manipulated variable, the routine 40 may present an error message to the user or operator informing the user or operator of the selection of a previously selected control or auxiliary variable. In this manner, the routine 40 prevents the selection of the same control or auxiliary variable for two or more different manipulated variables.

Figure 12:
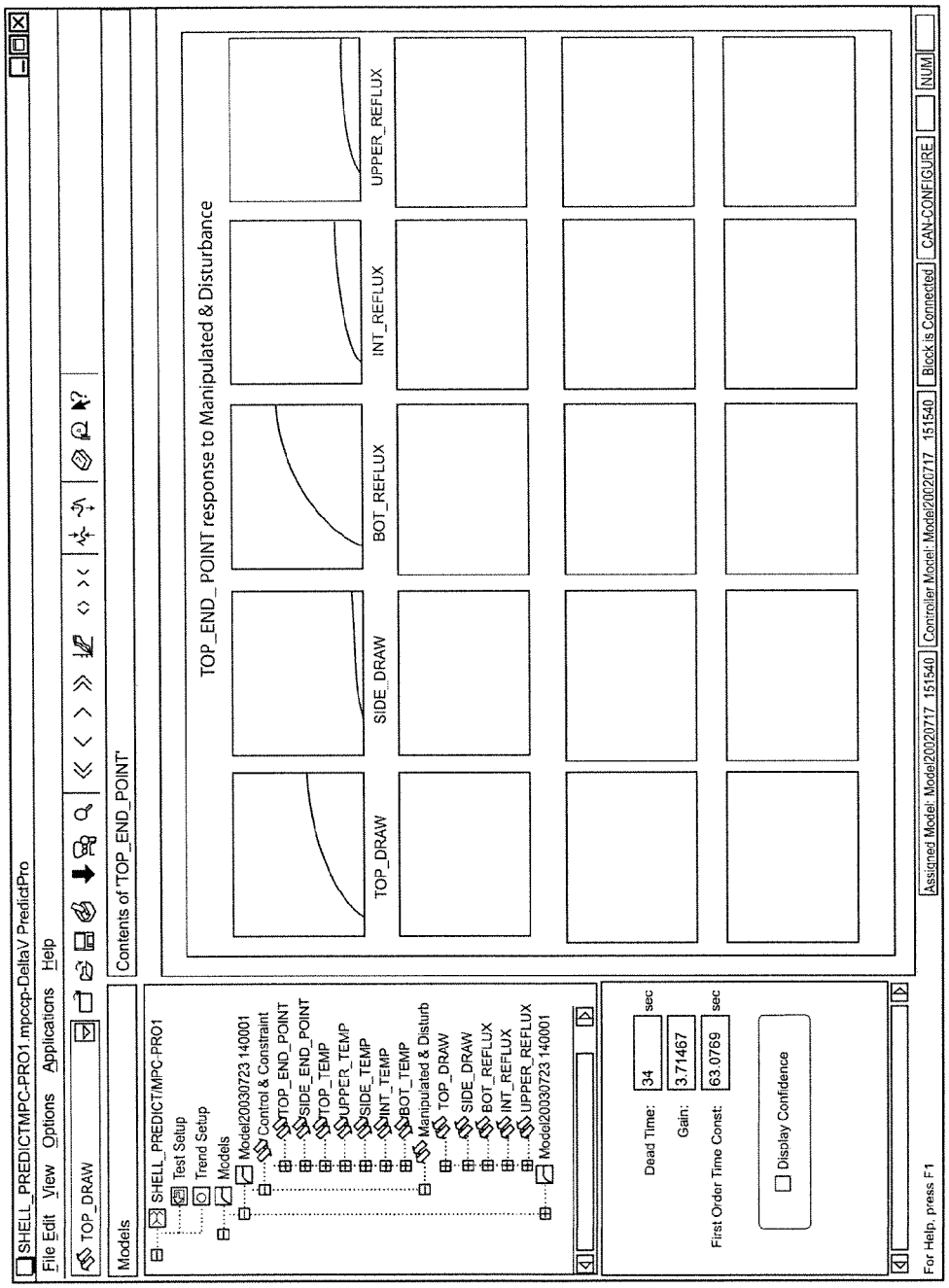
FIG. 12 is a screen display of a configuration routine illustrating a number of step responses indicating the response of the same control or auxiliary variable to different ones of the manipulated variables.

As illustrated in FIG. 12, the operator or user may also select to view the different step responses for each of the different manipulated variables and disturbance variables. FIG. 11 illustrates the step response of the TOP_END_POINT to each of the manipulated and disturbance variables previously specified for the advanced control block being created. Of course, the operator may use the screen of FIG. 12 to select one of the manipulated variables as being associated with the control variable TOP_END_POINT.

As will be understood, the display screens of FIGS. 10-12 enable the operator to visualize and select the subset of M control and auxiliary variables that will be used as inputs the MPC control algorithm which is especially useful when there are numerous ones of these variables. Of course, the set of control and constraint variables determined at the block 74 may be selected automatically or electronically based on some pre-established criteria or selection routine which may choose the input variables to use based on some combination of gain response and time delay as determined from the step responses for the controlled constrained variables and the manipulated variables.

In another embodiment, an automatic selection process may first determine a control matrix by selecting an input/output matrix based on the condition number of the matrix, e.g., by minimizing the condition number to some desired extent, and by then developing a controller configuration from the control matrix.

In this example, for a process gain matrix, A, the condition number of the matrix $A^T A$ may be determined to test the matrix controllability. A smaller condition number generally means better controllability while a higher condition number means less controllability and more control steps or moves during dynamic control operation. There are no strict criteria for defining an acceptable degree of controllability and, therefore, the condition number can be used as a relative comparison of various potential control matrices and as a test for ill conditioned matrices. As is known, a condition number for an ill conditioned matrix approaches infinity. Mathematically, ill conditioning occurs in the case of co-linear process variables—that is, due to co-linear rows or columns in the control matrix. Thus, a major factor that affects the condition number and controllability is cross-correlation between matrix rows and columns. Careful selection of the input-output variables in the control matrix can reduce conditioning problems. Practically, there should be a concern if the condition number of a control matrix is in the hundreds (e.g., 500) or higher. With such a matrix, controller manipulated variable moves are highly excessive.

As discussed above, the control matrix solves the dynamic control problem, while the LP optimizer solves the steady state optimization problem and the control matrix needs to be a square input-output matrix even though MPC controller block may have an unequal number of MVs (including AVs) and CVs. To begin selecting the inputs and output for the control matrix for use in generating the controller, all the available MVs are typically included or selected as controller outputs. After selecting the outputs (the MVs), the process output variables (i.e., the CVs and AVs) that are made part of the dynamic control matrix must be selected in such a manner to produce a square control matrix that is not ill conditioned.

One method of automatically or manually selecting the CVs and AVs as inputs within the control matrix will now be discussed, it being understood that other methods may be used as well.

Step 1—CVs are selected until, if possible, the number of CVs equals the number of MVs (i.e., the number of controller outputs). In the case in which there are more CVs than MVs, the CVs may be chosen in any order based on any desired criteria, such as the priority, gain or phase responses, user input, etc. If the total possible number of CVs is equal to the number of MVs then proceed to Step 4 to test the resulting square control matrix condition number for acceptability. If the number of CVs is less than the number of MVs, AVs may be selected as described in Step 2. If there are no CVs defined, select the AV with maximum gain relative to an MV and go to Step 2.

Step 2—Calculate one by one, the condition number for every possible AV added to already selected control matrix defined by the previously selected CVs and AVs. As will be understood, the matrix defined by the selected CVs will include a row for each selected CV and AV, defining the steady state gain for that CV or AV to each of the previously selected MVs.

Step 3—Select the AV determined in Step 2 that results in the minimum condition number for the resulting matrix and define the matrix as the previous matrix with the addition of the selected AV. If number of MVs now equals the number of selected CVs plus the number of selected AVs (that is, if the matrix is now square) go to Step 4. Otherwise return to Step 2.

Step 4—Calculate the condition number for the created square control matrix $A_c$. If desired, the condition number calculation for the matrix $A_c$ instead of the matrix $A_c^T A_c$ may be used, as the condition numbers for these different matrices are related as the squared root of the other.

Step 5—If the condition number calculated at Step 4 is acceptable, associate every CV and selected AV with an MV, by selecting the CV or AV having the maximum gain relative to a specific MV until the pairing is complete. At this point the selection process is complete. If, on the other hand, the condition number is greater than the minimum acceptable condition number, remove the last AV /CV added to the control matrix and perform the wrap-around procedure of Step 6.

Step 6—Perform a wrap-around procedure for each of the selected MVs, one at a time and calculate the condition number of the matrix that results from each wrap-around procedure. Essentially, a wrap-around procedure is performed by placing, in turn, a unity response for each of the different MVs in place of removed AV (or CV). The unity response will be unity at one of the positions in the row of the matrix and zero everywhere else. In essence, each the particular MVs is being used as an input and an output in this case instead of the AV to form a well conditioned square control matrix. As an example, for a four by four matrix, the combinations 1000, 0100, 0010, and 0001 will be placed in the row of the removed AV line in the gain matrix, $A_c$.

Step 7—After performing a wrap around procedure for each of the MVs, select the combination that results in the minimum condition number. If there is no improvement, keep the original matrix). At this point, associate every selected CV and selected AV with an MV, by selecting the CV or AV with maximum gain relative to a specific MV, excluding the MV that is used for controlling itself (i.e., the MV that was wrapped-around).

Of course, the control matrix defined by this procedure as well as the resulting condition number may be submitted to the user and the user can accept or reject the defined control matrix for use in generating the controller.

It should be noted that, in the automatic procedure described above, at most only one MV was selected for controlling itself (i.e., wrapped-around) for the purpose of improving controllability. In the manual procedure the number of wrapped-around MVs can be arbitrary. The MVs selected for controlling themselves are evident by the absence of a corresponding output variable selection in the controller configuration. Also, one can use more MVs as wrap-arounds for control if the number of MVs is greater than the number of total CVs plus AVs. In this way, at the end, a square control matrix is still provided to the controller having each of the MVs as outputs. It will be understood that the process of performing and using wrap-arounds means that the number of CVs and AVs selected for the control matrix can be less than the number of MVs controlled by the controller, with the difference being the number of MVs wrap-around as inputs the control matrix. Further, this wrap-around procedure can be used in a process that has less CVs plus AVs than MVs.

Of course, the condition number is calculated above using the steady state gains and, therefore, the control matrix defines controllability essentially for steady state. Process dynamics (dead time, lag, etc.) and model uncertainty also have an effect on dynamic controllability and these effects can be taken into account by changing the priority of process variables (e.g., control and auxiliary variables), which may dictate their inclusion in the control matrix due to the effects they have on dynamic control.

It is also possible to use other heuristic procedures intended to improve both steady state and dynamic controllability. Such a procedure would typically have number of heuristic criteria, possibly some that are contradictory, that are applied in several phases to develop a control matrix and, thereby select an appropriate set of controller inputs, that provide some improvements of the control matrix. In one such heuristic procedure, the CVs and the AVs will be grouped by MV based on the highest gain relationship. Then, for each MV grouping, the one process output with fastest dynamics and significant gain will be selected. This selection process may consider confidence interval and give preference to CVs over AVs (with all else equal). The process model generation routine will then use the parameter selected from each group during the MPC control generation. Because only one parameter is selected for each MV, the response matrix is square and can be inverted.

In any event, after choosing the subset of M (or less) control and auxiliary variable inputs to the MPC controller, a block 124 of FIG. 3 generates the process model or controller to be used in the MPC control algorithm 86 of FIG. 2 from the determined square control matrix. As is known, this controller generation step is a computationally intensive procedure. A block 126 then downloads this MPC process model (inherently including the control matrix) or controller and, if need be, the step responses and the steady state step response gain matrix to the control block 38 and this data is incorporated into the control block 38 for operation. At this time, the control block 38 is ready for on-line operation within the process 50.

Figure 13:
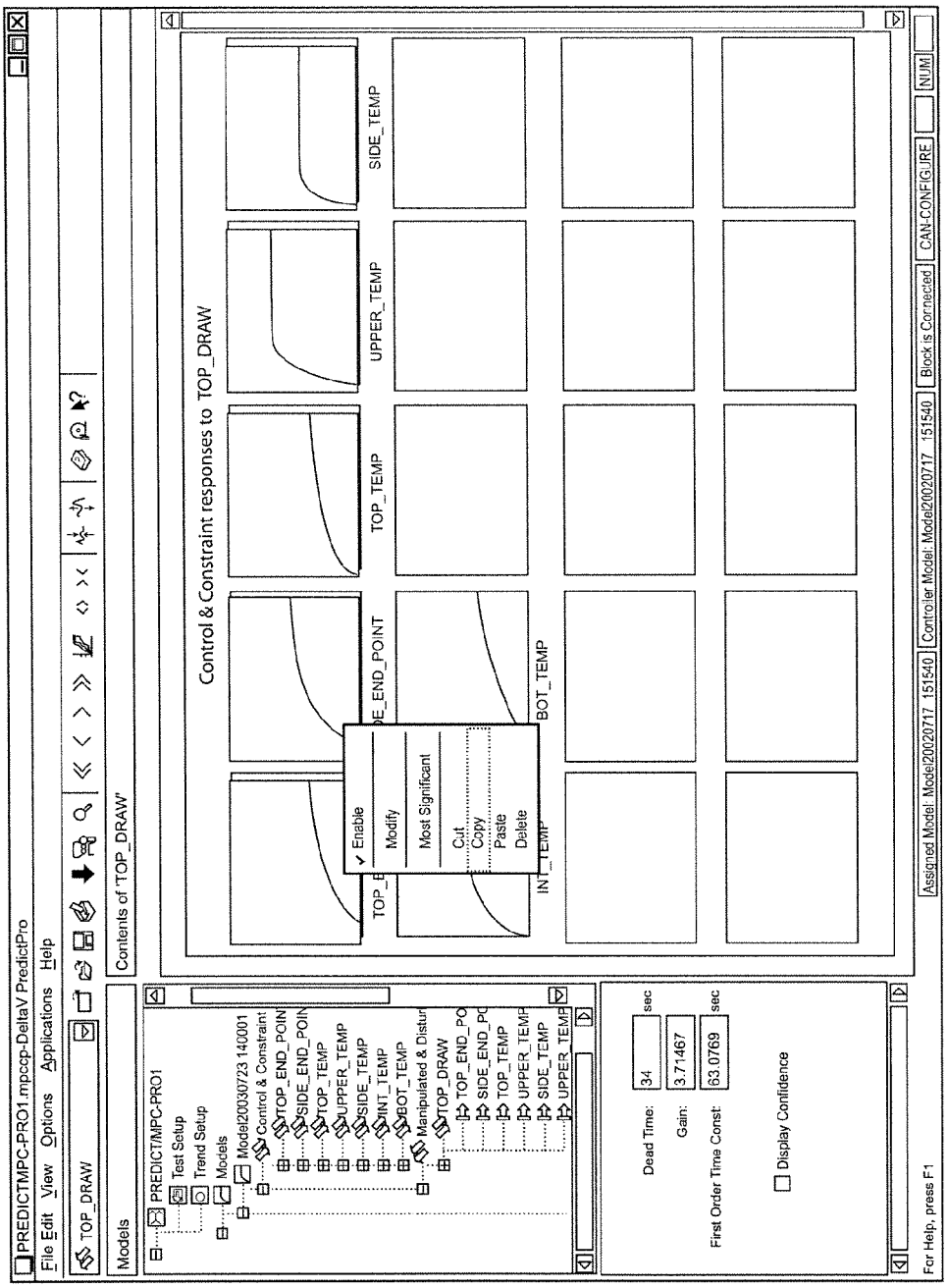
FIG. 13 is a screen display illustrating the manner of copying one of the step responses of a model to be copied for use in a different model.

If desired, the process step responses may be reconfigured or provided in a manner other than the generation of these step responses. For example, ones of the step responses may be copied from different models and provided into the screens of, for example FIGS. 10-12 to specify the step response of a certain control or auxiliary variable to a manipulated or disturbance variable. FIG. 13 illustrates a screen display in which the user may select and copy one of the step responses of a certain process or model and then drop or paste that same response into a different model and paste that step response into the new model to thereby enable the user to manually specify a step response model. Of course, as part of this process, the user may delete one or more of the step response models generated automatically as described above.

Figure 14:
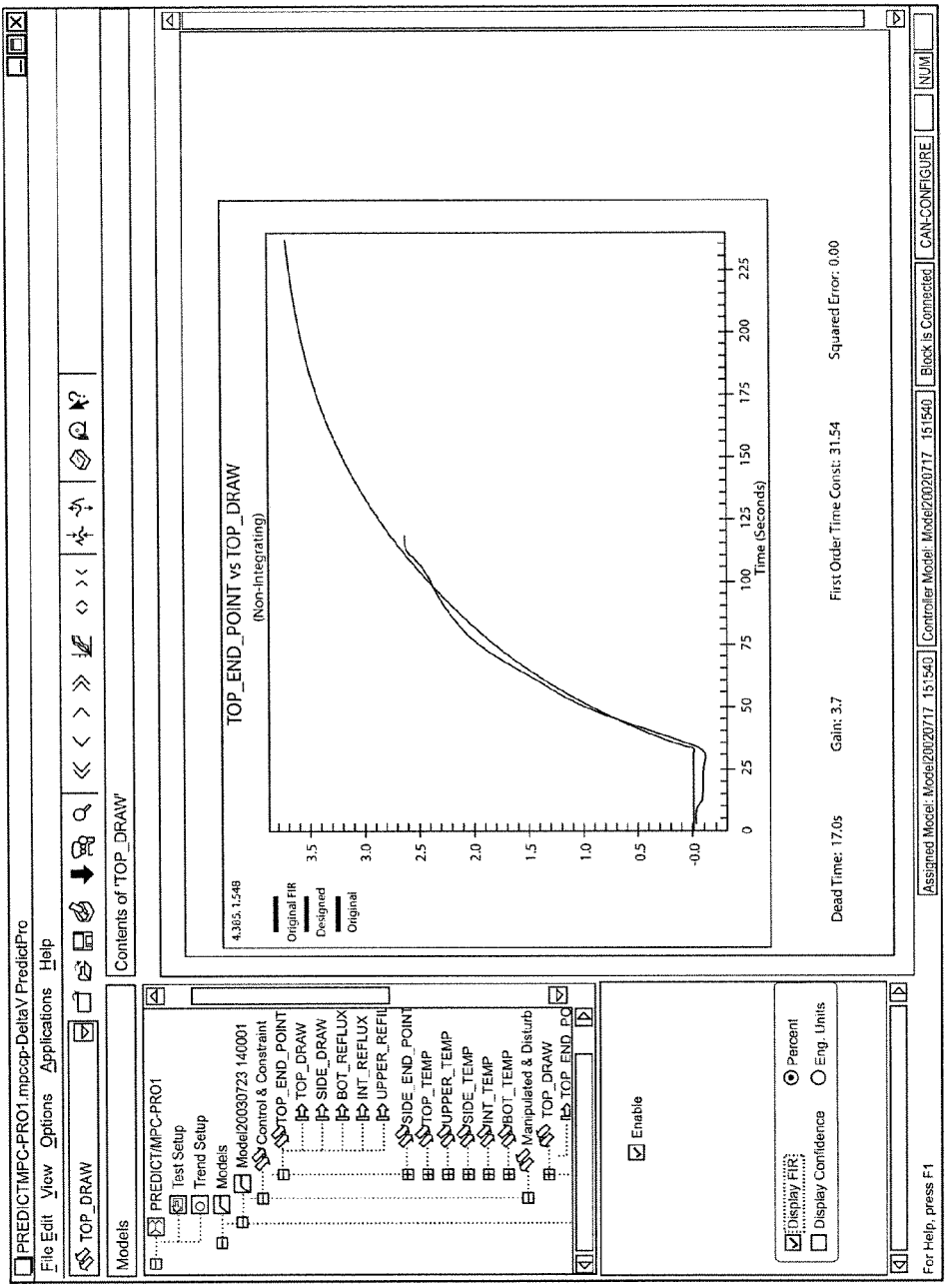
FIG. 14 is a screen display illustrating a manner of viewing and changing a step response curve.

FIG. 14 illustrates a screen display in which the user can view more particularly one of the step responses (here for the step response of TOP_END_POINT versus TOP-_DRAW). The parameters for this step response, such as the steady state gain, the response time, the first order time constant and the squared error are illustrated on the display for ease of reference to the user or operator. If desired, the user may view and change the properties of this step response by specifying different parameters, such as a different gain or time constant if so desired. If the user specifies a different gain or other parameter, the step response model can be mathematically regenerated to have this new parameter or set of parameters. This operation is useful when the user knows the parameters of the step response and needs to change the generated step response to match or meet these parameters.

Referring now to FIG. 4, the general steps performed during each operation cycle or scan of the advanced control block 38, as created using the flow chart 90a of FIG. 3, while the process 50 is operating on line are illustrated. At a block 150, the MPC controller 52 (FIG. 2) receives and processes the measured values of the control and auxiliary variables CV and AV. In particular, the control prediction process model processes the CV, AV and DV measurements or inputs to produce the future control parameter vector, as well as the predicted steady state control and auxiliary variables $CV_{SS}$ and $AV_{SS}$.

Next, at a block 152, the input processing/filter block 58 (FIG. 2) processes or filters the predicted control and auxiliary and manipulated variables $CV_{SS}$, $AV_{SS}$ and $MV_{SS}$ developed by the MPC controller 52 and provides these filtered values to the optimizer 54. At a block 154, the optimizer 54 executes standard LP techniques to determine the set of M manipulated variable targets $MV_T$ which maximize or minimize the selected or default objective function while not violating any of the limits of the auxiliary and manipulated variables and while keeping the control variables at their specified set point or within the specified ranges for these variables. Generally speaking, the optimizer 54 will calculate a target manipulated variable solution $MV_T$ by forcing each of the control variables and the auxiliary variables to their limits. As noted above, in many cases, a solution will exist in which each of the control variables are at their set point (which may initially be treated as an upper limit on the control variable) while each of the auxiliary variables remain within their respective constraint limits. If this is the case, then the optimizer 54 need only output the determined manipulated variable targets $MV_T$ that produce an optimal result for the objective function.

In some cases, however, due to tight constraints on some or all of the auxiliary or manipulated variables, it may be impossible to find an operating point at which all of the control variables are at their set point and all of the auxiliary variables are within their respective constraint limits because such a solution does not exist. In these cases, as noted above, the optimizer 54 may allow the control variables to relax within their specified set point ranges in an attempt to find an operating point in which the auxiliary variables operate within their respective limits. If no solution exists in this case, then the optimizer may drop one of the auxiliary variable constraint limits as a limit within the solution and, instead, determine the optimal process operating point ignoring the dropped auxiliary variable constraint limits. Here, the optimizer chooses which auxiliary or control variable to drop as a constraint limit based on the respective weights provided for each of the control and auxiliary variables (with, for example, the lowest weight or highest priority being dropped first). The optimizer 54 continues to drop auxiliary or control variables based on their provided weights or priorities until it finds an target manipulated variable $MV_T$ solution in which all of the set point ranges for the control variables and the limits for the remaining, higher priority auxiliary variables are met.

Next, at a block 156, the target conversion block 55 (FIG. 2) uses the steady state step response gain matrix to determine the target values of the control and auxiliary variables $CV_T$ and $AV_T$ from the target values for the manipulated variables $MV_T$ and provides the selected N (where N is equal to or less than M) subset of these values to the MPC controller 52 as target inputs. At a block 158, the MPC controller 52 uses the control matrix or logic derived therefrom to operate as an unconstrained MPC controller as described above to determine the future CV and AV vector for these target values, performs vector subtraction with the future control parameter vector to produce the future error vector. The MPC algorithm operates in a known manner to determine steady state manipulated variable $MV_{SS}$ based on the process model developed from the M by M step responses and provides these $MV_{SS}$ values to the input processing/filter block 58 (FIG. 2). At a block 160, the MPC algorithm also determines the MV steps to be output to the process 50 and outputs the first of these steps to the process 50 in any appropriate manner.

During operation, one or more monitoring applications run in, for example, one of the interfaces 13 may subscribe to information from the advanced control block or other function blocks communicatively connected thereto, either directly or through the historian 12, and provide one or more viewing or diagnostics screen to the user or operator for viewing the operational state of the advanced control block. Function block technology features cascade inputs (CAS_IN) and remote cascade inputs (RCAS_IN) as well as corresponding back calculation outputs (BKCAL_OUT and RCAS_OUT) on both control and output function blocks. It is possible, using these connectors, to attach a supervisory optimized MPC control strategy on top of the existing control strategy and this supervised control strategy may be viewed using one or more viewing screens or displays. Likewise, targets for the optimized MPC controller can be modified from a strategy as well, if so desired.

FIG. 15 is an example screen display that may be produced by one or more such viewing applications illustrating an optimizer dialog screen which provides information to the operator pertaining to the operation of the advanced control block during operation thereof. In particular, the inputs to the process (the manipulated variables MV) and the outputs (the control and auxiliary variables CV and AV) are illustrated separately. For each of these variables, the screen display illustrates the name (descriptor) of the variable, the current value, as measured, a set point if applicable, the target value as calculated by the optimizer, the units and unit values of the variable change and an indication of the current variable values. For the output variables, an indication of whether this variable is one of the selected variables used in the MPC controller, the predicted value of this variable as determined by the MPC controller and the preset priority for this variable is also indicated. This screen enables the operator to view the current operational state of the advanced control block to view the manner in which the advanced control block is performing control. Still further, the user may configure some controlled parameters for remote set point capability so that outside applications may set operating targets for throughput coordination.

Figure 16:
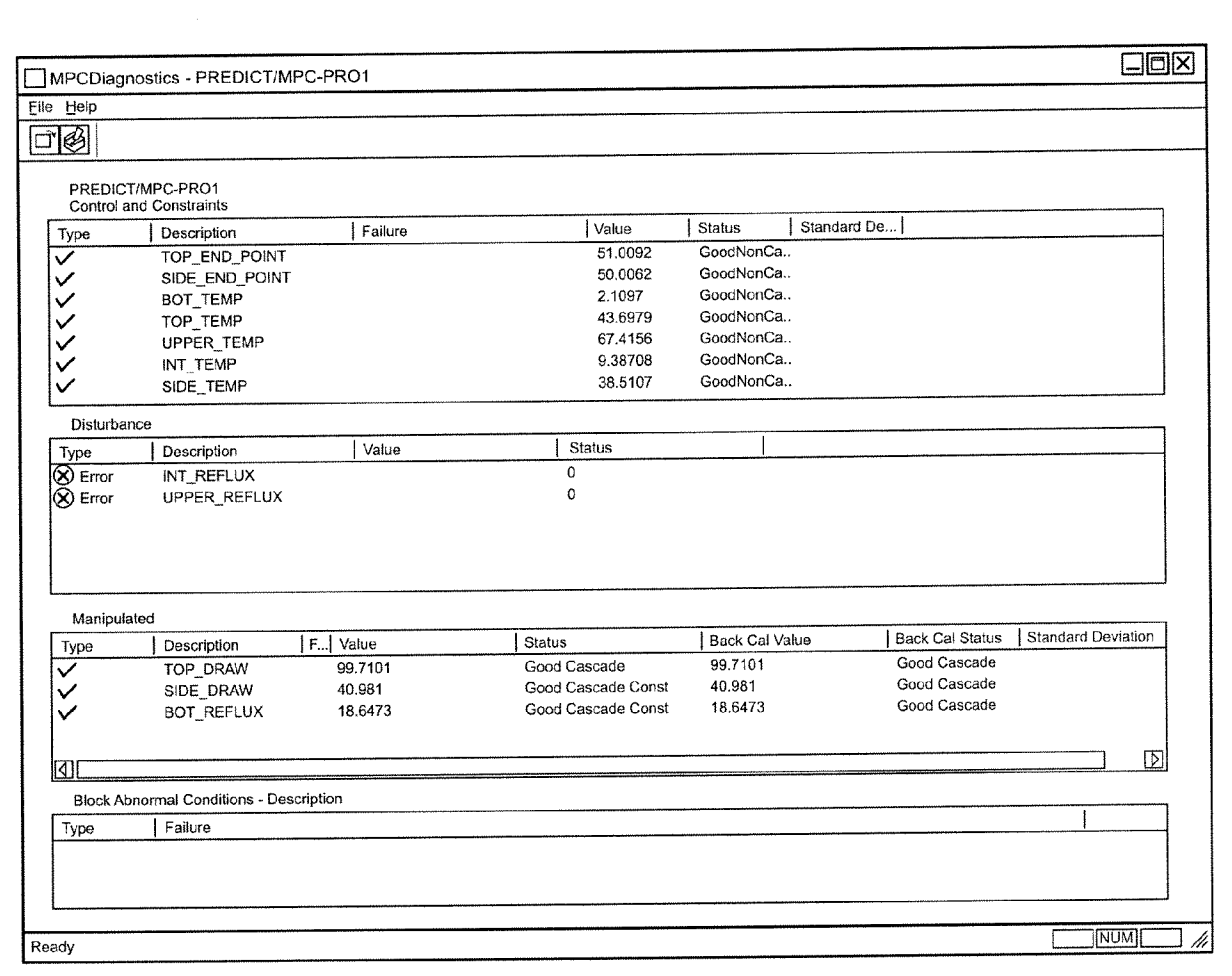

FIG. 16 is a screen display that may be generated by a diagnostics application illustrating a diagnostics screen that may be provided to a user or operator to perform diagnostics on an advanced control block. In particular, the diagnostics screen of FIG. 16 separately illustrates the control and constraint (auxiliary) variables, the manipulated variables and the disturbance variables. For each, the name or descriptor of the variable is provided along with (in the first column) an indication of whether an error or alert condition exists for this variable. Such an error or alert may be graphically illustrated using, for example, a green check mark or a red "x" or in any other desired manner. A value and status is also indicated for each of these variables. For the manipulated variables, the value and status of the Back_Cal (back calculated or feedback) variable for these signals is illustrated. As will be understood, this screen can be used to perform diagnostics on the advanced control block by providing the operator with information necessary to determine problems within the control system. Of course, other types of screens and information can be provided to the operator to enable the operator to view the operation of and to perform diagnostics on the advanced control block and the module in which it is implemented.

While the advanced function block has been illustrated herein as having an optimizer located within the same function block and therefore executed in the same device as the MPC controller, it is also possible to implement the optimizer in a separate device. In particular, the optimizer may be located in a different device, such as in one of the user workstations 13 and communicate with the MPC controller as described in conjunction with FIG. 2 during each execution or scan of the controller to calculate and provide the target manipulated variables ($MV_T$) or the subset of the control and auxiliary variables (CV and AV) determined therefrom to the MPC controller. Of course, a special interface, such as a known OPC interface, may be used to provide the communication interface between the controller and the function block having the MPC controller therein and the workstation or other computer that implements or executes the optimizer. As in the embodiment described with respect to FIG. 2, the optimizer and MPC controller must still communicate with each other during each scan cycle to perform integrated optimized MPC control. However, in this case, other desired types of optimizers may be used, such as known or standard real time optimizers that may already exist within a process control environment. This feature may also be used advantageously if the optimization problem is non-linear and the solution requires non-linear programming techniques.

While the advanced control block and other blocks and routines described herein have been described herein as being used in conjunction with Fieldbus and standard 4-20 ma devices, they can, of course, be implemented using any other process control communication protocol or programming environment and may be used with any other types of devices, function blocks or controllers. Although the advanced control blocks and the associated generation and testing routines described herein are preferably implemented in software, they may be implemented in hardware, firmware, etc., and may be executed by any other processor associated with a process control system. Thus, the routine 40 described herein may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc. (which is viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control configuration system for use in creating or viewing a control block having an integrated optimizer and a multiple-input/multiple-output control routine, comprising:

a computer readable medium;

a configuration routine stored on the computer readable medium for execution on a processor, the configuration routine including;

a storage routine that stores information pertaining to a plurality of control and auxiliary variables and to a multiplicity of manipulated variables used by the integrated optimizer and the multiple-input/multiple-output control routine;

a display routine that presents a display to a user regarding one or more of the control, auxiliary and manipulated variables; and wherein the display routine when executed further displays a screen that enables a user to view stored information pertaining to one of the set of manipulated variables, the set of control variables and the set of auxiliary variables and tabs associated with the others of the set of the manipulated variables, the set of the control variables and the set of the auxiliary variables which can be selected to view the others of the set of the manipulated variables, the set of the control variables and the set of the auxiliary variables, and a multiplicity of parameters associated with each variable within the one of the set of control variables, the set of auxiliary variables, the set of the manipulated variables and a communication path name as one of the multiplicity of parameters.

2. The process control configuration system of claim 1, wherein the storage routine when executed stores a plurality of response curves, each of the response curves defining the response of one of the control and auxiliary variables to one of the manipulated variables and wherein the display routine when executed prestents on the display a subset of the response curves to be viewed by a user, the subset of the response curves including the response of each of the control and auxiliary variables to one of the manipulated variables.

3. The process control configuration system of claim 2, wherein the configuration routine includes a first routine that enables a user to select one of the control and auxiliary variables as being best responsive to one of the manipulated variables on the display.

4. The process control configuration system of claim 2, wherein the configuration routine further includes a selection routine that provides one of the response curves selected by the user to the optimizer for use by the optimizer to perform process related operations.

5. The process control configuration system of claim 1, wherein the storage routine when executed stores a plurality of response curves, each of the response curves defining the response of one of the control and auxiliary variables to one of the manipulated variables and wherein the display routine when executed presents on the display a subset of the response curves to be viewed by a user, the subset of the response curves including the response of one of the control and auxiliary variables to each or the manipulated variables.

6. The process control configuration system of claim 4, wherein the configuration routine that enables a user to select one of the control and auxiliary variables as being best responsive to one of the manipulated variables on the display.

7. The process control configuration system of claim 5, wherein the first routine enables the user to select one of the control and auxiliary variables as being best responsive to one of the manipulated variables by selecting one of the response curves.

8. The process control configuration system of claim 6, wherein the display routine when executed displays a response curve associated with a previously selected one of the control and auxiliary variables in a manner to indicate that the control or auxiliary variable has been previously selected as being best responsive to one of the manipulated variables.

9. The process control configuration system of claim 1, wherein the storage routine when executed stores a plurality of response curves, each of the response curves defining the response of one of the control and auxiliary variables to one of the manipulated variables and wherein the display routine when executed operates, in a first setting, to display a subset of the plurality of the response curves including the response of each of the control and auxiliary variables to one of the manipulated variables and operates, in a second setting, to display a subset of the plurality of the response curves including the response of one of the control and auxiliary variable to each of the manipulated variables.

10. The process control configuration system of claim 9, wherein the configuration routine includes a first routine that enables a user to select one of the control and auxiliary variables as being best responsive to one of the manipulated variables on the display.

11. The process control configuration system of claim 9, wherein the display routine when executed displays the response curves for each one of the control and auxiliary variables to each one of the manipulated variables, with only the response curves for a single one of the control and auxiliary variables being displayed at the same time.

12. The process control configuration system of claim 9, wherein the display routine when executed displays the response curves for each one of the control and auxiliary variables to each one of the manipulated variables, with only the response curves for a single one of the manipulated variables being displayed at the same time.

13. The process control configuration system of claim 9, wherein the display routine when executed enables a user to copy one of the response curves and to paste the copied one of the response curves in a different control block.

14. The process control configuration system of claim 1, wherein the display routine when executed displays a variable name as one of the muitiplicity of parameters.

15. The process control configuration system of claim 1, wherein the display routine when executed displays one or more limits as one of the multiplicity of parameters.

16. The process control configuration system of claim 1, wherein the display routine when executed displays a set point as one of the multiplicity of parameters.

17. The process control configuration system of claim 1, wherein the display routine when executed displays a priority indication as one of the multiplicity of parameters.

18. The process control configuration system of claim 1, wherein the display routine when executed displays a profit or cost indication to be used by the optimizer as one of the multiplicity of parameters.

19. The process control configuration system of claim 1, wherein the display routine when executed enables a user to add or delete one or more of the displayed control, auxiliary or manipulated variables.

20. The process control configuration system of claim 1, wherein the storage routine when executed stores a set of objective functions for use in the optimizer and wherein the display routine when executed presents indications of the objective functions to the user via the display and enables the user to select one of the set of objective functions as the objective function to use within the optimizer.

21. The process control configuration system of claim 1, wherein the display routine when executed displays a diagnostics screen that displays diagnostic information pertaining to at least one set of the control, auxiliary and manipulated variables.

22. The process control configuration system of claim 21, wherein the diagnostic information includes names of the control, auxiliary or manipulated variables within the at least one sex of the control, auxiliary and manipulated variables.

23. The process control configuration system of claim 21, wherein the diagnostic information includes status indications of the control, auxiliary or manipulated variables within the at least one set of the control, auxiliary and manipulated variables.

24. The process control configuration system of claim 21, wherein the diagnostic information includes values of the control, auxiliary or manipulated variables within the at least one set of the control, auxiliary and manipulated variables.

25. The process control configuration system of claim 21, wherein the diagnostic information includes an alarm or alert indication for one or more of the control, auxiliary or manipulated variables within the at least one set of the control, auxiliary and manipulated variables.

26. The process control configuration system of claim 1, wherein the display routine when executed displays a viewing screen that displays current information pertaining to at least one set of the control, auxiliary and manipulated variables.

27. The process control configuration system of claim 26, wherein the current information includes a current value for each of one or more of the control, auxiliary or manipulated variables within the at least one set of the control, auxiliary and manipulated variables.

28. The process control configuration system of claim 26, wherein the current information includes a prediction value for each of one or more of the control, auxiliary or manipulated variables within the at least one set of the control, auxiliary and manipulated variables.

29. The process control configuration system of claim 26, wherein the current information includes a limit value for each of one or more of the control, auxiliary or manipulated variables within the at least one set of the control, auxiliary and manipulated variables.

30. The process control configuration system of claim 26, wherein the current information includes a target value for each of one or more of the control, auxiliary or manipulated variables within the at least one set of the control, auxiliary and manipulated variables.

31. The process control configuration system of claim 1, wherein the configuration routine further includes a selection routine that provides at least one of the control, auxiliary and manipulated variables selected by the user to the optimizer for use by the optimizer to perform process related operations.

* * * * *

UNITED STATES PATENT AND TRADEMARK OFFICE
CERTIFICATE OF CORRECTION

PATENT NO. : 7,330,767 B2  
APPLICATION NO. : 10/310416  
DATED : February 12, 2008  
INVENTOR(S) : Dirk Thiele et al.

Page 1 of 1

It is certified that error appears in the above-identified patent and that said Letters Patent is hereby corrected as shown below:

In the Specification:

At Column 5, line 3, "depicted n" should be -- depicted in --.

At Column 16, line 43, "$K_{omp\text{-}c}E_{p+1}(k)$" should be -- $K_{ompc}E_{p+1}(K)$ --.

At Column 17, line 21, "$\Delta MVT$" should be -- $\Delta MV_T$ --.

In the Claims:

At Column 29, line 19, "each or the" should be -- each of the --.

At Column 29, line 20, "4" should be -- 5 --.

At Column 29, line 21, "routine" should be -- routine includes a first routine --.

At Column 29, line 48, "variable" should be -- variables --.

At Column 30, line 38, "sex" should be -- set --.

Signed and Sealed this

Nineteenth Day of August, 2008

JON W. DUDAS  
*Director of the United States Patent and Trademark Office*